(12) United States Patent
Petersen

(10) Patent No.: US 11,522,426 B2
(45) Date of Patent: Dec. 6, 2022

(54) DOUBLE/TWIN RADIAL AIR GAP PERMANENT MAGNET BRUSHLESS MOTOR

(71) Applicant: Petersen Technology Corporation, Pocasset, MA (US)

(72) Inventor: Christian C. Petersen, Pocasset, MA (US)

(73) Assignee: Petersen Technology Corporation, Pocasset, MA (US)

( * ) Notice: Subject to any disclaimer, the term of this patent is extended or adjusted under 35 U.S.C. 154(b) by 255 days.

(21) Appl. No.: 16/797,260

(22) Filed: Feb. 21, 2020

(65) Prior Publication Data

US 2020/0274430 A1    Aug. 27, 2020

Related U.S. Application Data

(60) Provisional application No. 62/810,490, filed on Feb. 26, 2019.

(51) Int. Cl.
*H02K 16/02*     (2006.01)
*H02K 1/14*      (2006.01)
*H02K 3/52*      (2006.01)

(52) U.S. Cl.
CPC ............ *H02K 16/02* (2013.01); *H02K 1/146* (2013.01); *H02K 3/522* (2013.01); *H02K 2201/03* (2013.01); *H02K 2203/03* (2013.01); *H02K 2203/12* (2013.01)

(58) Field of Classification Search
CPC ..... H02K 16/02; H02K 3/522; H02K 2201/03
USPC ............ 310/49.37, 49.42, 216.066, 216.072, 310/266–268, 114
See application file for complete search history.

(56) References Cited

U.S. PATENT DOCUMENTS

| | | |
|---|---|---|
| 4,745,345 A | 5/1988 | Petersen |
| 4,837,474 A | 6/1989 | Petersen et al. |
| 4,949,000 A | 8/1990 | Petersen |

(Continued)

FOREIGN PATENT DOCUMENTS

| | | | | |
|---|---|---|---|---|
| CN | 101994761 A | * | 3/2011 | |
| JP | 2008278603 A | * | 11/2008 | ............... H02K 3/28 |
| KR | 20080094274 A | * | 10/2008 | |

*Primary Examiner* — Jose A Gonzalez Quinones
(74) *Attorney, Agent, or Firm* — Morse, Barnes-Brown & Pendleton, P.C.; Sean D. Detweiler, Esq.; Stanley F. Chalvire, Esq.

(57) ABSTRACT

A twin radial air gap permanent-magnet-on-rotor brushless motor with a rotor comprising two magnet rings and a stator comprising individual iron-core-based stator pole modules containing a wound stator pole element with outward facing and inward facing radial pole surfaces, co-planar with the two magnet rings across the twin radial motor operating air gaps. Pole modules are mounted in a circular array upon an insulating surface or printed circuit board in automatic assembly operations interconnecting field coil windings in the desired pattern and including other electrical control components, with pole modules centered on the motor rotation axis and predominantly enclosed by the rotor. Field coil windings are supported by insulating bobbins located around the radial extent of the stator pole elements between the outer and inner facing radial pole surfaces with electrical means for connection to the electrical interconnection function supplied with the insulating surface or circuit board.

24 Claims, 11 Drawing Sheets

(56) References Cited

U.S. PATENT DOCUMENTS

| | | | |
|---|---|---|---|
| 5,659,217 A | 8/1997 | Petersen | |
| 5,874,796 A | 2/1999 | Petersen | |
| 6,617,747 B1 | 9/2003 | Petersen | |
| 6,707,224 B1 | 3/2004 | Petersen | |
| 7,598,649 B2 | 10/2009 | Petersen | |
| 8,310,126 B1 * | 11/2012 | Hopkins | H02K 1/278 310/216.057 |
| 2006/0087186 A1 * | 4/2006 | Wasson | H02K 21/12 310/268 |
| 2011/0316365 A1 * | 12/2011 | Kim | H02K 3/28 310/43 |

* cited by examiner

Fig. 4
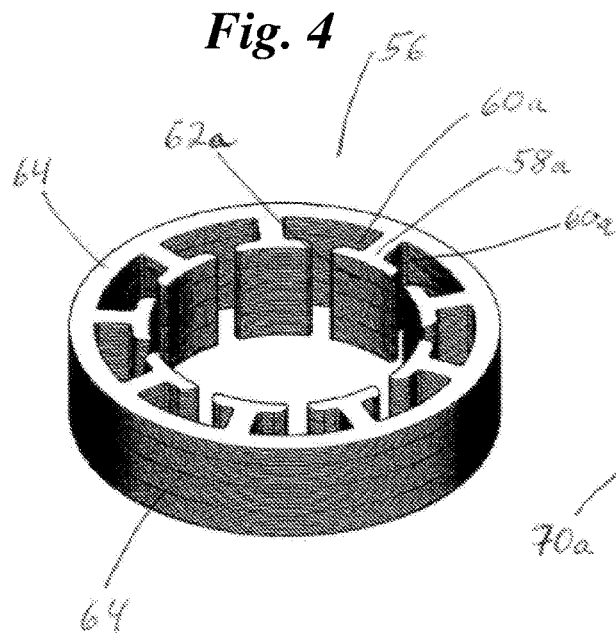
Fig. 5
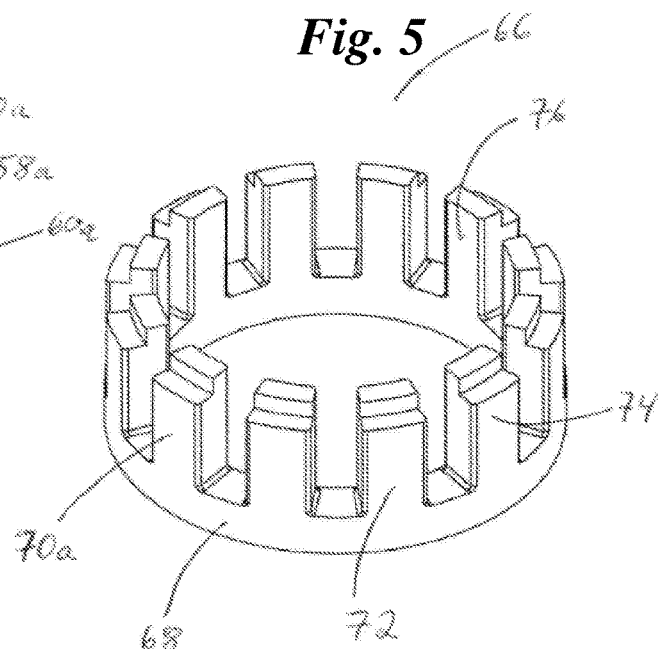
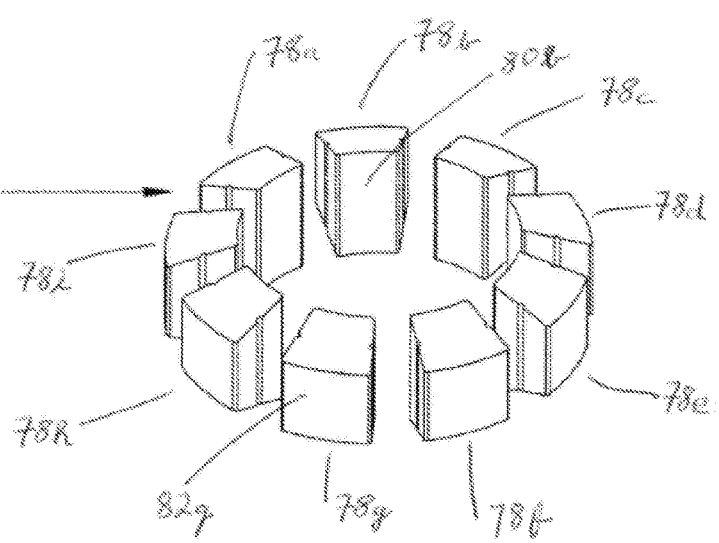
Fig. 6           Fig. 7

*Fig. 8*
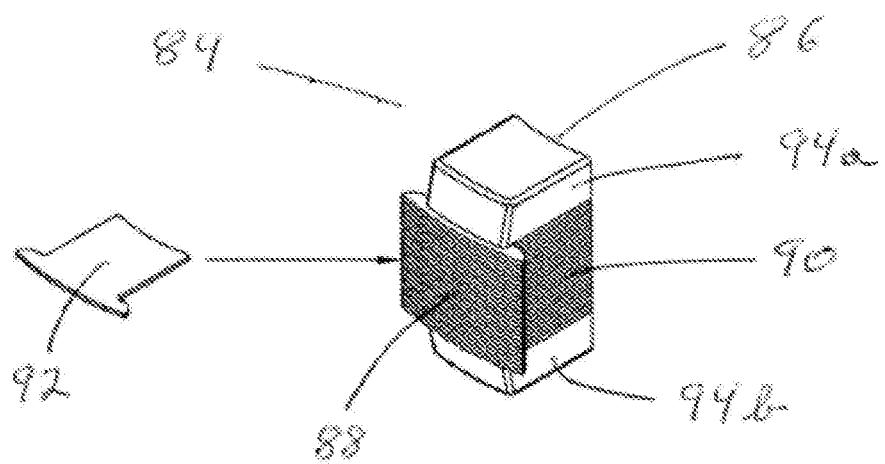
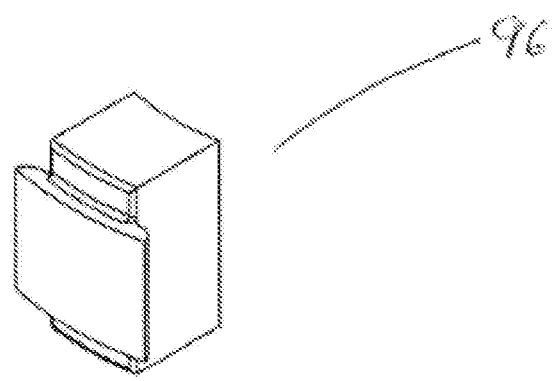
*Fig. 9*

*Fig. 10*  *Fig. 11*  *Fig. 12*
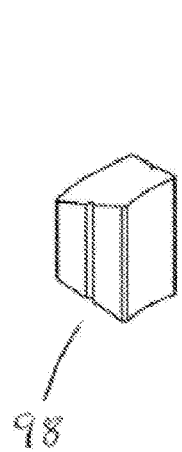
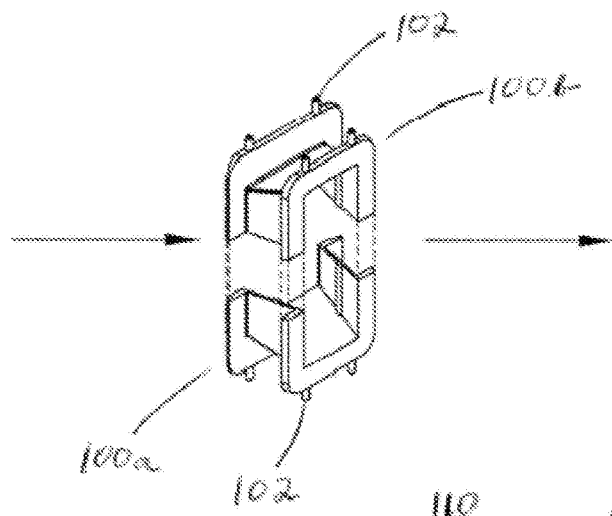
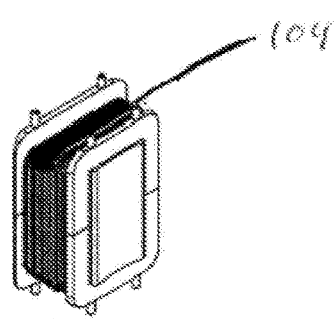
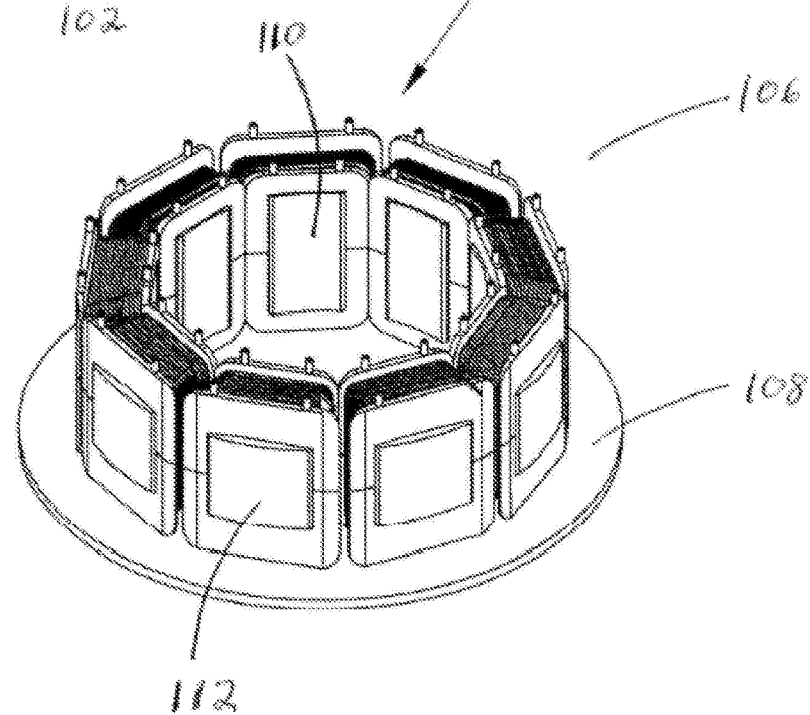
*Fig. 13*

*Fig. 15*
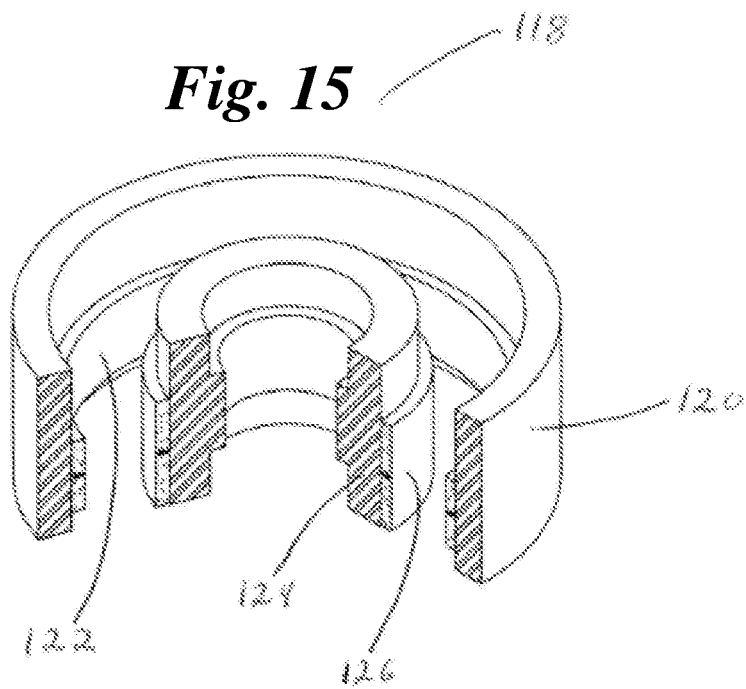
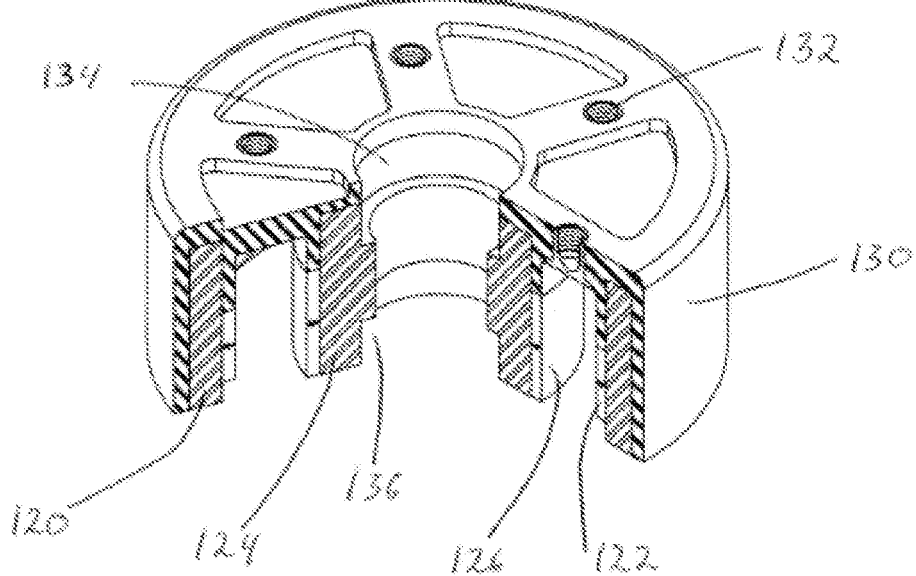
*Fig. 16*

Fig. 18
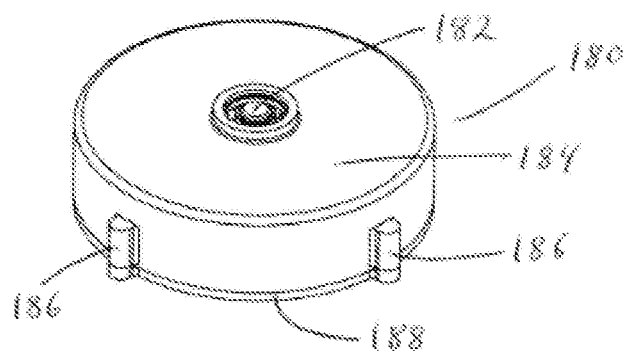
Fig. 19
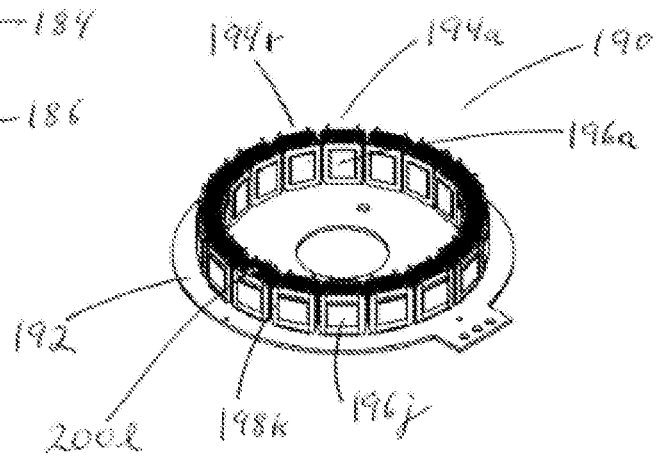
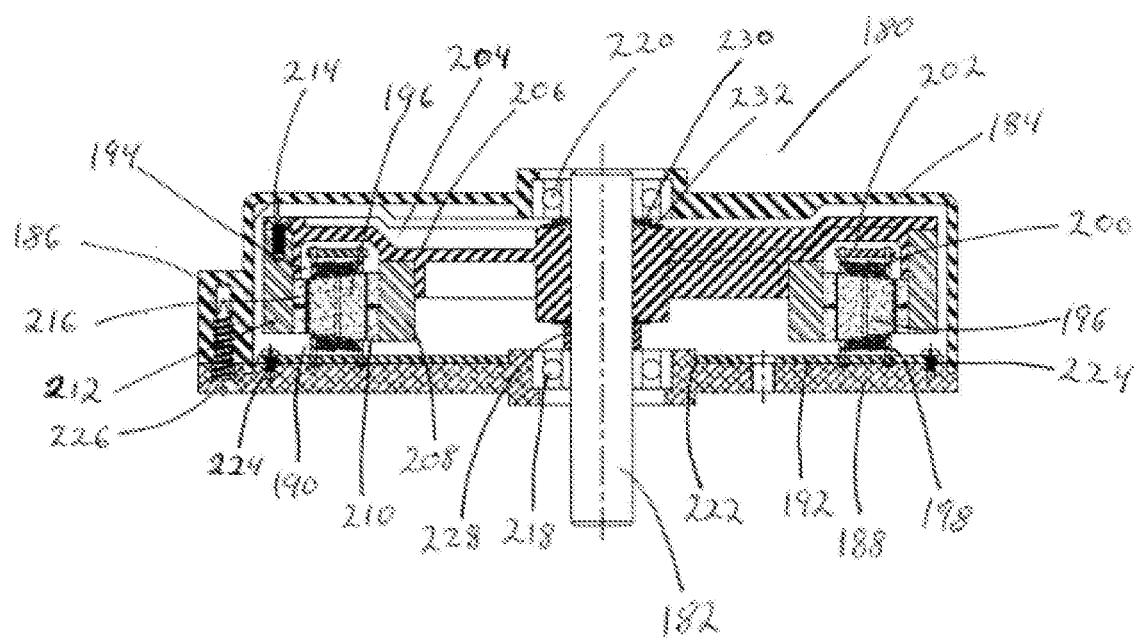
Fig. 20

Fig. 21
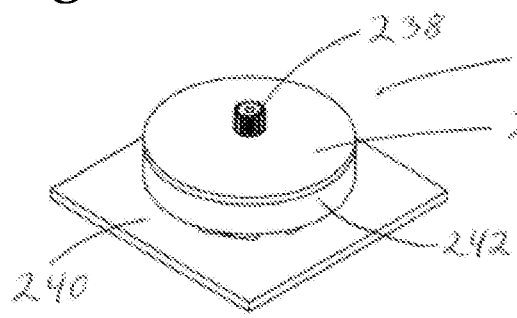
Fig. 22
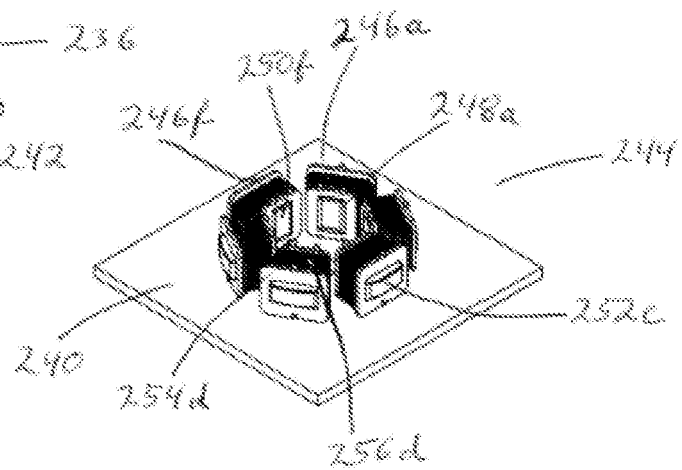
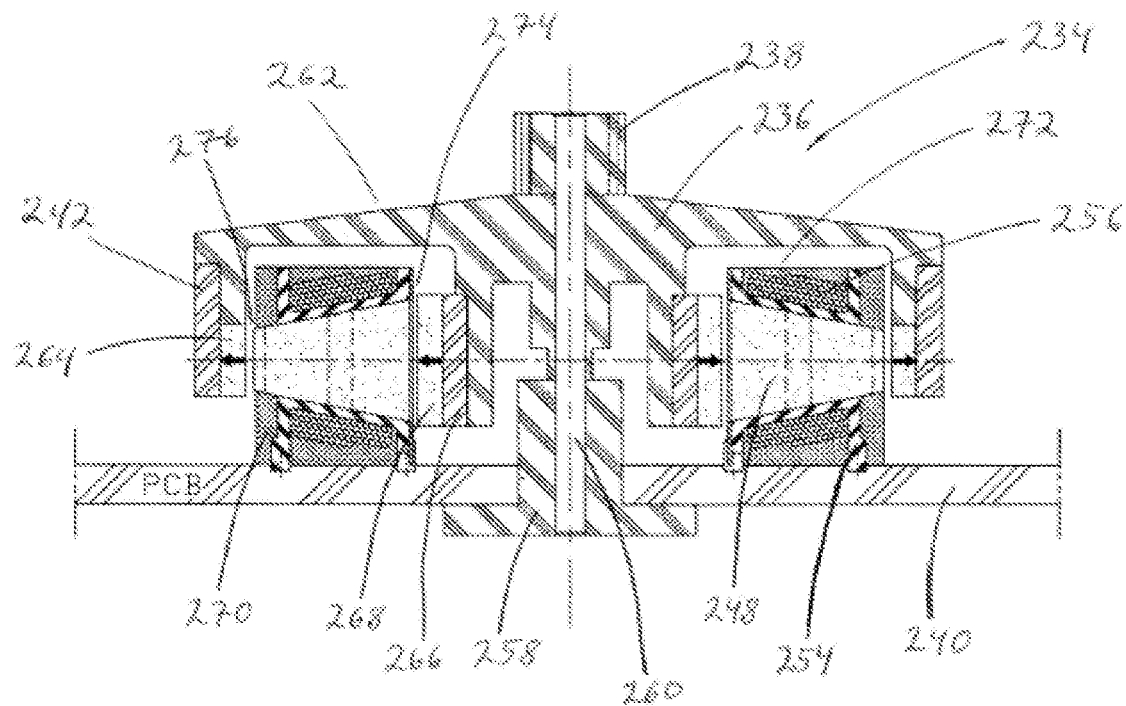
Fig. 23

*Fig. 24*
*Fig. 25*
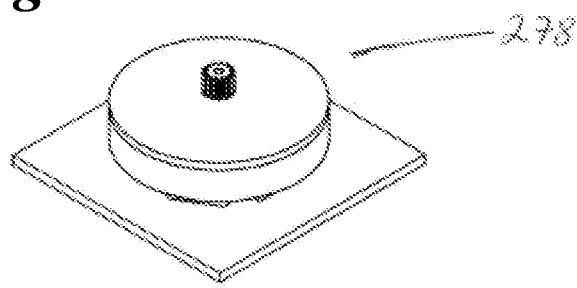
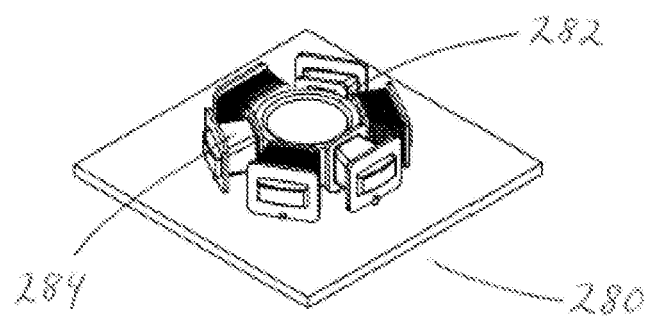
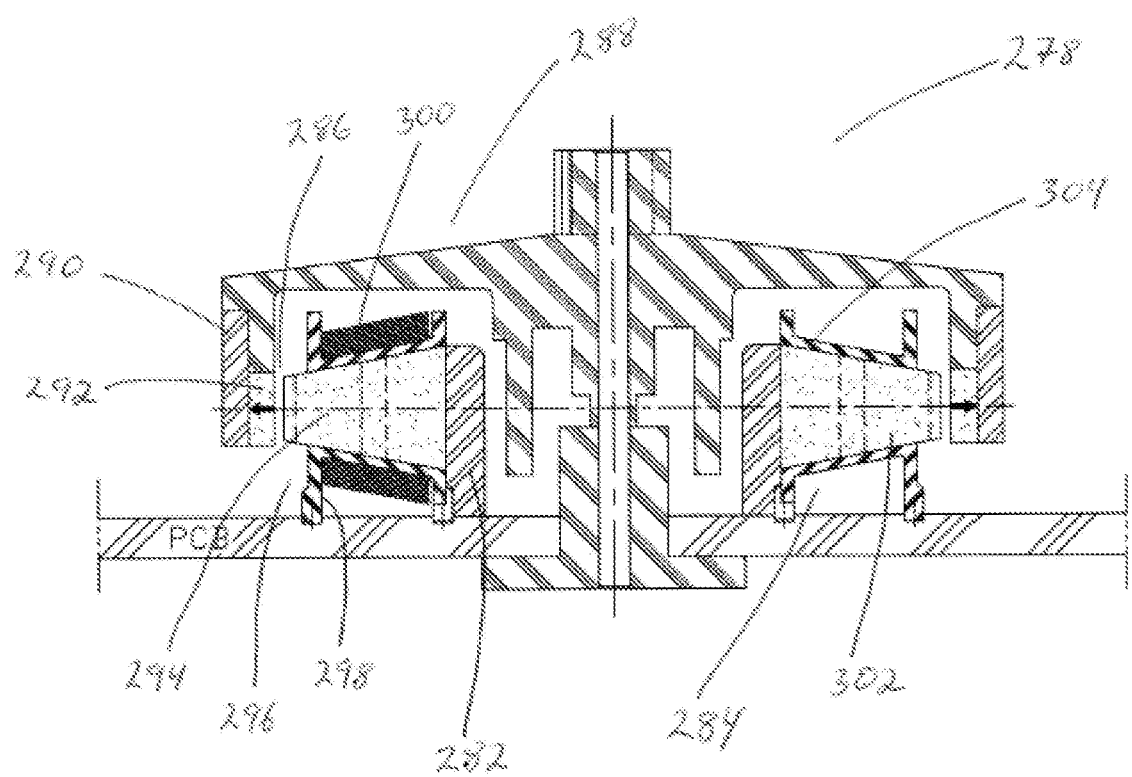
*Fig. 26*

DOUBLE/TWIN RADIAL AIR GAP PERMANENT MAGNET BRUSHLESS MOTOR

CROSS-REFERENCE TO RELATED APPLICATION(S)

This application claims priority to, and the benefit of, U.S. Provisional Application No. 62/810,490, filed Feb. 26, 2019, for all subject matter common to both applications. The disclosure of said provisional application is hereby incorporated by reference in its entirety.

FIELD OF THE INVENTION

The present invention relates to a twin radial air gap permanent-magnet-on-rotor brushless motor with two magnet rings and a stator comprised of individual, wound, iron-core-based stator pole modules, such system suitable for conversion of electrical energy to mechanical work through rotor rotation under a mechanical load. In particular, the present invention relates to a twin radial air gap permanent-magnet-on-rotor brushless motor with two magnet rings and a stator comprised of individual iron-core-based stator pole modules that each contain a wound stator pole element with outward facing and inward facing radial pole surfaces, co-planar with the two magnet rings across the twin radial motor operating air gaps, such system suitable for conversion of electrical energy to mechanical work through rotor rotation under a mechanical load.

BACKGROUND

Generally, as automation increases to ease daily life and there is a need for advances in electric motors as the primary transfer agent from electrical energy to mechanical work. Higher efficiency and smaller size coupled with lower weight are primary driving factors in most applications in automotive, appliances and HVAC (heating and air conditioning). Those requirements are coupled with electronic controllability to meet product needs for most applications. Additionally, the demand for motors meeting these requirements is increasing dramatically challenging the manufacturer to improve production efficiency and supply. The primary motor type that is most often filling these needs is the brushless permanent magnet type produced in various configurations such as permanent-magnet-on-rotor or imbedded permanent magnet for use in both DC and AC applications. Brush type or standard AC induction motors are seeing less application because of the lower efficiency and controllability issues along with their typical higher weight and larger size.

This advanced technology has been a requirement of motors used in the computer information storage industry from the start and has now spread across the entire motor application spectrum yielding products that consume less power for a given application along with size, weight and performance advantages, all cherished by the final customer, we the consumer.

Petersen has been an innovator in this type of electric motor technology, initially focused on the computer industry hard drive information storage market. In U.S. Pat. No. 4,745,345 entitled "D.C. Motor with Axially Disposed Working Flux Gap" issued 17 May 1988, Petersen described a permanent-magnet-on-rotor type brushless motor with a stator built as a series of vertical iron poles utilizing motor lamination material formed in a circular array on a magnetically permeable base with an "axial" type working flux gap located at the open end of the iron poles each of which contained a field winding wound on a simple bobbin and interconnected to meet the winding pattern required for the design and the number of poles on the permanent magnet rotor. The "axially" magnetized permanent-magnet-on-rotor was configured with a magnetically permeable "back iron" to complete the magnetic circuit. This configuration yielded a motor with highly regular torque vs. angular motion and good controllability. Its design was focused on the emerging 3½ inch "single" disk HDD market which was the first really large volume HDD for personal computers also emerging at that time.

Petersen in U.S. Pat. No. 4,949,000 entitled "D.C. Motor", issued Aug. 14, 1990 describes an improved version of the basic axial field P.M. magnetic architecture of U.S. Pat. No. 4,745,345, where the magnet field is "split" into an inner and outer axial ring slightly displaced from the stator pole active top pole surface so as to form the flux path in a shear form at the sides of the pole tips effectively converting the flux path to a more radial form when interfacing with the stator pole tips. This advancement led to a significant reduction in the dynamic axial forces present in a typical axial gap motor and a very low level of motor ripple torque both highly desirable characteristic for applications in computer hard disk drives and other computer related motor applications. Plus, this allowed for a much smaller diameter motor suitable to fit in the hub of the 3½ inch HDD storage disk.

Petersen in U.S. Pat. No. 4,837,474 entitled "D.C. Motor", issued Jun. 6, 1989 describes a brushless PM motor in which each of the stator vertical iron-based poles is composed of three radially spaced apart iron pole components in flux conducting relationship with a winding located on the center of the three pole components. The upper part of the poles extending above the coil winding forming the flux return paths for the coil winding through two gaps formed between the vertical poles segments. Co-located in those gap spaces are two radially magnetized rotor magnet rings. Each magnet ring supported on its edge to a non-magnetic rotor above said gaps. This configuration was established to give a low vertical motor profile along with localized rotor force balancing and low ripple torque, all advantageous characteristics for under disk hard disk drive applications. This design approach also made each stator pole/winding of the total stator assembly magnetically independent from the succeeding pole/winding in the total stator array.

Petersen in U.S. Pat. No. 5,659,217 entitled "Permanent Magnet D.C. Motor Having A Radially-Disposed Working Flux Gap" issued Aug. 19, 1997 describes a PM brushless motor having a higher power producing capability than preceding designs and mass producible at practical cost levels commensurate with incorporation of the motors into products intended for the consumer marketplace. The unique combination of a vertical stator utilizing bobbin wound field coils and a radially magnetized rotor interfacing with the vertical stator at a radial flux interfacing surface located longitudinally above the coil winding area provided a motor with a high torque producing capability for a given motor diameter because the working air gap was disposed at a greater radius from the shaft/centerline vs. the motor outside diameter than what was possible with traditional radial gap brushless motors. Also, the use of bobbin wound field coils in place of the traditional pole field winding of inside gap radial brushless motors enhanced manufacturability from both a speed and cost standpoint. The power producing capabilities were further enhanced by the addition of a second radial magnet rotor ring located on the opposite outward facing radial side of the vertical stator. See also: Petersen, U.S. Pat. No. 5,874,796, issued Feb. 23, 1999.

The advent of effective iron-based powdered metals embodied in soft magnetic composites (SMC) where each power particle is effectively insulated from surrounding particles and then pressed and heat treated (not sintered) yielded a potential replacement for typical motor lamination material in many motor applications. This new material had advantages in having much lower eddy current losses than motor lamination material but also disadvantages in having lower permeability. Therefore, brushless motors with inherent higher core switching speeds as compared to traditional A.C. induction motors would be an application area for this material.

Petersen in U.S. Pat. No. 6,617,747 entitled "PM Motor And Generator With A Vertical Stator Core Assembly Formed Of Pressure Shaped Processed Ferromagnetic Particles" issued Sep. 9, 2003 and companion patent of the same name issued Mar. 16, 2004 describes a PM brushless motor with expanded capabilities and manufacturability vs. the motors disclosed in preceding U.S. Pat. Nos. 5,659,217 and 5,874,796. The stator assemblies for these motors could now be produced in a single piece in a single pressing process. Since the longitudinal view of the vertical stator (pressing direction) presents a much smaller surface area as compared to a conventional radial style stator the press size and corresponding pressing cycle for comparative designs are both smaller and with a shorter press cycle in the vertical example yielding a lower cost component. This also means a stator for a larger, higher power motor can be produced in a single piece with the vertical motor technology. Since the SMC material can be net-shaped variations in both shape and thickness are possible with a SMC formed stator vs. a laminated steel stator. Various brushless motors have been produced using this technology for various applications in consumer and automotive applications. Models with running power outputs as high as ½ HP for HVAC applications have been fabricated with a single piece stator component. The resulting prototype motors were roughly ⅓ the size and weight of conventional AC induction motors and 50% more efficient.

Petersen in U.S. Pat. No. 7,598,649 entitled "Vertical Stator Double Gap D.C. PM Motors" issued Oct. 6, 2009 further improved the vertical stator motor design technology by employing the shaping possibilities of SMC material in a Double Gap vertical stator embodiment to adjust the stator pole height above the stator pole winding area on the inner and outer radial surfaces so as to approximate a more equal active pole surface area on the inside facing surface to the inside rotor magnet ring as compared to the outside facing surface to the outside rotor magnet ring. This technique enhanced the balancing of the undesirable non-torque component of the air gap force vectors present in the air gap at energized stator pole coils by approximately balancing and effectively canceling the undesirable non-torque components present at each energized stator pole coil. These unbalance force vectors are present in all single gap PM motor designs and requires using a "standard" magnet pole to stator pole combination in order to cancel the unwanted individually unbalancing force vectors present at an energized pole by summing those forces on a multipole 360-degree basis. This improvement meant that non-standard magnet pole to stator pole combinations, which fail to balance those forces on a 360-degree basis when used in a single gap motor design, can be used in double gap higher power motors. The non-standard pole combinations can reduce to practically zero the unwanted mechanical detent forces present in typical magnet pole to stator pole combinations in a typical permanent-magnet-on-rotor brushless motor yielding smoother operation. Petersen further disclosed an additional method of reducing the mechanical detent forces present in "standard" magnet pole to stator pole combinations by offsetting circumferentially the magnet poles on the inner rotor ring vs. the outer rotor ring by positioning the two rings approximately 180 degrees of detent cycle torque from each other. This reduced the need for the typical method of "skewing" the transitions between the adjacent north and south pole areas of the rotor magnet to reduce unwanted mechanical detent forces.

The history of the Petersen style motor has shown an increasing range of capability along with a simplified manufacturing process that opens up the application range and manufacturing possibilities for this type of motor. A product manufacturer that previously purchased all their motors from dedicated motor manufacturers now have an option to assemble the Petersen style motor in-house with reduced capital outlays and tooling costs. This can yield lower costs, shorter supply pipelines, more controllability and quicker turn around plus a better branded product with bigger value added. Also, product design is becoming more integrated where the motor portion is no longer just an add-on but an integrated part of the overall product.

However, current technology and systems experience some shortcomings. Unwanted mechanical detent forces present in typical magnet pole to stator pole combinations in a typical permanent-magnet-on-rotor brushless motor can inhibit efficient and smooth motor operation. Traditional pole field windings of inside gap radial brushless motors are also costly and difficult to efficiently manufacture. The relatively large and single piece stators of both conventional motors and Petersen SMC Vertical stator motors dictate separate manufacturing processes for the motor portion and the electronic control portion of a brushless motor, also the extended pole surface of the Petersen Vertical stator structure results in unnecessary additional iron losses. Greater torque and power producing capability in smaller and lighter packages with further improved efficiencies continues to be a need in the field.

SUMMARY

There is a continual need for enhanced torque producing capability for a given motor size and since torque is basically a force applied at a radius or moment arm the proximity of the motor operating air gap to the outside diameter generally means greater torque production for a given motor diameter. Conventional inside gap radial brushless motors don't do well in this regard and versions that operate with only an outside gap can't supply the balanced torque producing capabilities of a double or twin gap approach, as presented herein, which also generally results in a shorter length to the motor and overall better performance. The addition of a second radial magnet rotor ring and second operating air gap enhances use of non-standard magnet pole/stator pole combinations that can reduce to practically zero the unwanted mechanical detent forces present in typical magnet pole to stator pole combinations in a typical permanent-magnet-on-rotor brushless motor yielding smoother operation. Further, the extreme reduction in stator iron accomplished through re-forming the motor stator poles into individual wound radial elements located radially between the now present twin air gaps and magnet rings significantly reduces physical size of the stator components that not only enhance automatic assembly but significantly reduces iron losses and reduces size and weight in the overall motor design. Moreover, the location of the stator pole elements mid the twin air gaps permits the magnet fields from each rotor magnet ring to be in an aiding flux field relationship which enhances motor performance as compared to an opposing relationship and which enhances manufacturability of the rotor assembly. Additionally, the use of bobbin wound field coils in place of the traditional pole field winding of inside gap radial brushless motors simplifies the motor winding manufacturing process. Thus, there is a need for a twin radial air gap permanent-magnet-on-rotor brushless motor with two magnet rings and a stator comprised of individual iron-core-based stator pole modules that each contain a wound stator pole element with outward facing and inward facing radial pole surfaces, co-planar with the two magnet rings across the twin radial motor operating air gaps. The present invention is directed toward further solutions to address these needs, in addition to having other desirable characteristics. Specifically, as disclosed herein, the present invention takes a large step forward in combining many of the previous Petersen motor concepts by using the basic individual modular stator pole concept of U.S. Pat. No. 4,837,474 with the use of SMC material and its shaping benefits along with the double radial working air gap of succeeding patents and the approximate matching of the stator pole inner facing and outer facing co-planar radial pole surfaces to facilitate the construction of an advanced performance permanent-magnet-on-rotor brushless motor. The individual stator pole elements, now significantly reduced in size, are wound to form a module and can be individually over-molded or over-molded as an assembly of individual modules after being installed on a printed circuit board. These relatively small modules can be integrated with the manufacturing processes used in electronic circuit assembly on a printed circuit board. This further facilitates the electrical interconnection process between the individual stator pole modules and additionally said printed circuit board can contain other electrical components necessary for an operational electronically commutated electric motor. To enhance basic motor performance and keep the size of the individual stator pole module to a minimum, enhancing automatic assembly as an electronic component, the relative radial distance between the inner and outer co-planar rotor magnet rings is increased over the previous "vertical" stator designs and the field winding is placed directly around the stator pole element between the inner facing radial pole surface and the outer facing radial pole surface instead of below those pole surfaces. This reduces the iron or SMC portion of the total stator assembly by as much as 70% as compared to previous "vertical" stator Double Gap motor designs of equivalent motor power output. The improved physically smaller stator pole modules not only enhance assembly but significantly reduce iron losses and reduce size and weight in the overall motor design. Petersen defines this as the TwinGap Taperpole BLDC motor. Another feature of this invention is the change of the twin radial air gap flux field patterns to aiding and not opposing which improves air gap flux performance. Further, the twin facing rotor radial permanent magnet facing surfaces, co-located facing the respective stator pole surfaces, which are now aiding enhances the manufacturing process for the rotor twin magnet rings with the potential to use a high energy molded magnet structure that can be co-molded in a single or multiple step process in a rotor assembly manufacturing process which would include the molded rotor component itself connecting both molded twin magnet rings along with the soft magnetic back-iron component rings located directly inward of the internal radially magnetized rotor magnet ring and directly outward of the radially magnetized outer rotor magnet ring. The rotor assembly molding process can also include the shaft or other internal motor structure such as the retaining structure for the bearings etc. As noted above, the individual stator pole elements that are wound individually with a field coil, with their electrical terminal formed extensions of the field coils can be over-molded individually to form a component for automatic insertion or placed on a printed circuit board containing other component parts of the electronic control system for the BLDC motor. This circular array of stator pole modules can additionally be formed or over-molded into an integral circular ring giving enhanced mechanical stability and co-located around the central motor support system for the shaft or bearing system. Addition of the completed rotor assembly into the central support system fitting over the circular array of stator pole modules on the circuit board would then complete the basic motor assembly.

In accordance with example embodiments of the present invention, a permanent-magnet-on-rotor electric motor apparatus comprises a rotor assembly configured to rotate about a motor axis, including a rotor component, an inner magnet component ring, with a first radius extending from the motor axis, a plurality of rotor magnet poles that are magnetized radially, and an inner iron-based back-iron component ring, connected to the inside of the inner magnet component ring proximal to the motor axis, an outer magnet component ring, configured and disposed to be similar, concentric and parallel to the inside magnet component ring, and comprising a second radius extending from the motor axis, a plurality of rotor magnet poles that are magnetized radially, and an outer iron-based back-iron component ring, connected to the outside of the outer magnet component ring distal to the motor axis. As shown in the various embodiments, the magnet component rings are not directly connected to the rotor component, but are generally molded (if plastic magnets used) to the back-iron components which are in turn supported and located by the rotor component. In embodiments with no rotor shaft, the stator assembly may contain a fixed central support structure that does not rotate (viewable in certain figures). In some of the example embodiments, the rotor component is itself the output driver of the motor and the rotor assembly does not contain a shaft. A stator assembly is configured to be co-located with the rotor assembly about the motor axis, comprising a plurality of stator pole modules mounted on an insulating surface in a circular arrangement concentric within both the outer magnet component ring and the inner magnet component ring, wherein each stator pole module of the plurality of stator pole modules comprises one or more coil windings and a stator pole element iron-based core, an inner radial surface opposite an outer radial surface offset from the inner radial surface by a normal distance dimensioned and disposed to fit between, and be approximately axially co-extensive with, the inner magnet component ring and the outer magnet component ring; and wherein the one or more coil windings are configured and disposed to be interconnected electrically in a wound-pole arrangement corresponding to a basic electrical design requirement of the permanent-magnet-on-rotor electric motor apparatus. The basic electrical design requirement is defined as comprising a number of motor phases, a number of stator poles, a number of rotor poles, and an electrical drive methodology.

In accordance with aspects of the present invention, the permanent-magnet-on-rotor electric motor apparatus stator assembly can be over-molded with a mechanical support comprising an electrically insulating, non-magnetic material forming connections between each of the plurality of stator pole modules and connecting to the insulating surface, wherein the mechanical support is configured and disposed to be placed between a first circular limit corresponding to each inner radial surface and a second circular limit corresponding to each outer radial surface.

In accordance with aspects of the present invention, the insulating surface of the stator assembly can comprise a printed circuit board comprising electrical interconnections between the one or more coil windings and mechanical support for the plurality of stator pole modules in placement locations around a circumference of the circular arrangement.

In accordance with aspects of the present invention, each stator pole element of the plurality of stator pole modules can comprise a pressure-shaped iron-based soft magnetic composite material. Alternatively, each stator pole element of the plurality of stator pole modules can comprise a motor lamination material.

In accordance with aspects of the present invention, each inner radial surface and each outer radial surface can be approximately equal in surface area and each outer radial surface can be greater in circumferential length than each inner radial surface.

In accordance with aspects of the present invention, a first perimeter of each inner radial surface can be connected to a second perimeter of each outer radial surface of each stator pole element by a first planar surface, a second planar surface, a third planar surface, and a fourth planar surface in a non-parallel configuration, thereby circumscribing approximately equal radial cross-sectional areas throughout for each stator pole element. Alternatively, a cross section shape of each stator pole element can change from a first perimeter of each inner radial surface to a second perimeter of each outer radial surface by increasing circumferential length while reducing axial length in a direction parallel to the motor axis to maintain the outer radial surface area as approximately equal to the inner radial surface area. In this way the surface area of the inner stator pole element radial surface rectangular cross section shape can remain relatively constant as the radius from the inner surface of said stator pole element extends outward toward the outer radial surface and near that extent the cross section can change shape only in a flare circumferential fashion to extend the stator pole element shape in the circumferential direction while reducing the vertical length along the motor axis so as to maintain the outer radial surface area consistent with the inner radial surface area.

In accordance with aspects of the present invention, each of the plurality of stator pole modules can comprise an insulative bobbin arrangement surrounding, supporting, and locating each stator pole element of the plurality of stator pole modules on the insulating surface, and supporting the one or more coil windings on said insulating surface.

In accordance with aspects of the present invention, the inner magnet component ring of the rotor assembly can comprise a plastic injection moldable magnetic material integral with the inner back-iron component ring, and wherein the outer magnet component ring of the rotor assembly can comprise a plastic injection moldable magnetic material integral with the outer back-iron component ring. The inner magnet component ring and the outer magnet component ring can be magnetized with eight alternating poles, and the stator assembly can comprise nine stator pole modules and a plurality of coil windings can be interconnected for three-phase motor operation, energized in a three-phase motor electrical sequence to produce motor rotation. The plurality of stator pole modules can be each automatically assembled in a circular array on a printed circuit board comprising electrical interconnections between each stator pole element comprising a wound coil configuration, mechanical support and mechanical placement locations for the plurality of stator pole modules.

In accordance with example embodiments of the present invention, a stator assembly for a permanent-magnet-on-rotor electric motor, configured to be co-located with a rotor assembly about a motor axis, comprises a plurality of stator pole modules mounted on a supporting surface in a circular arrangement concentric with at least one magnet component ring, wherein each stator pole module of the plurality of stator pole modules comprises a stator pole element with an iron-based core, with an inner radial surface opposite an outer radial surface offset from the inner radial surface by a normal distance and configured to be axially co-extensive with, at least one magnet component ring; and wherein each of the plurality of stator pole modules comprises an insulative bobbin arrangement circumscribing, supporting, and mounting each stator pole element of the plurality of stator pole modules on the supporting surface, and wherein stator pole elements of the plurality of stator pole modules further comprising wound stator pole elements are interconnected electrically in a wound-pole arrangement and electrically activated sequentially to produce motor rotation.

In accordance with aspects of the present invention, each stator pole element of the plurality of stator pole modules can comprise a motor lamination material.

In accordance with aspects of the present invention, the supporting surface of the stator assembly can comprise an electrical circuit board comprising electrical interconnections between the wound stator pole elements and mechanical support for the plurality of stator pole modules in the circular arrangement.

In accordance with aspects of the present invention, each of the stator pole elements of the plurality of stator pole modules can comprise a pressure-shaped iron-based soft magnetic composite material.

In accordance with aspects of the present invention, each inner radial surface and each outer radial surface can be approximately equal in surface area and each outer radial surface can be greater in circumferential length than each inner radial surface.

In accordance with aspects of the present invention, a first perimeter of each inner radial surface can be connected to a second perimeter of each outer radial surface of each stator pole element by a first planar angled surface, a second planar angled surface, a third planar angled surface, and a fourth planar angled surface in a non-parallel configuration, thereby circumscribing approximately equal radial cross-sectional areas for each stator pole element.

In accordance with aspects of the present invention, a cross section shape of each of the stator pole elements can change from a first perimeter of each inner radial surface to a second perimeter of each outer radial surface by increasing circumferential length while reducing axial length in a direction parallel to the motor axis to maintain the outer radial surface area as approximately equal to the inner radial surface area.

In accordance with aspects of the present invention, the stator assembly can be over-molded with a mechanical support comprising an electrically insulating, non-magnetic material forming connections between each of the plurality of stator pole modules and connecting to the supporting surface, wherein the mechanical support can be configured and disposed to be placed between a first circular limit having a third radius corresponding to each inner radial surface and a second circular limit having a fourth radius corresponding to each outer radial surface.

In accordance with aspects of the present invention, the plurality of stator pole modules each can be automatically assembled in a circular array on the electrical circuit board comprising electrical interconnections between the wound stator pole elements and mechanical support and mechanical placement locations for the plurality of stator pole modules.

In accordance with aspects of the present invention, the stator assembly can further comprise an iron-based stator pole module flux conducting ring, concentrically contacting the inner radial surface of each stator pole element of the plurality of stator pole modules, comprising a cross section configured to conduct magnetic flux of the permanent-magnet-on-rotor electric motor present in the iron-based stator pole module flux conducting ring at a rated threshold operating voltage and current.

In accordance with aspects of the present invention, each of the stator pole elements of the plurality of stator pole modules can be radially confronted on the outer radial surface by a rotor assembly comprising a permanent magnet ring concentrically offset from the outer radial surface by an air gap, wherein the permanent magnet ring is disposed approximately co-extensive axially with the outer radial surface of each of the stator pole elements, and wherein the rotor assembly is mounted for rotation concentrically around the motor axis shared by the rotor assembly and the stator assembly.

In accordance with aspects of the present invention, the stator assembly can further comprise an iron-based stator pole module flux conducting ring, concentrically contacting the outer radial surface of each stator pole element, comprising a cross section configured to conduct magnetic flux of the permanent-magnet-on-rotor electric motor present in the iron-based stator pole module flux conducting ring at a rated threshold operating voltage and current.

In accordance with aspects of the present invention, each of the stator pole elements of the plurality of stator pole modules can be radially confronted on the inner radial surface by a rotor assembly comprising a permanent magnet ring concentrically offset from the inner radial surface by an air gap and disposed approximately co-extensive axially with the stator pole element inner radial surface, wherein the rotor assembly is mounted for rotation concentrically around the motor axis shared by the rotor assembly and the stator assembly.

In accordance with aspects of the present invention, the stator assembly can be surrounded by a rotor comprising a first magnet component ring and a second magnet component ring concentric with, and offset from, the first magnet component ring, disposed around the plurality of stator pole modules such that the first magnet component ring confronts, and is offset by a first air gap from, the inner radial surface of each stator pole element, and the second magnet component ring confronts, and is offset by a second air gap from, the outer radial surface of each stator pole element, wherein the first magnet component ring is backed by and connected, opposite the first air gap, to a first back-iron component ring, disposed in flux conducting relationship with the first magnet component ring and the second magnet component ring is backed by and connected, opposite the second air gap, to a second back-iron component ring, disposed in flux conducting relationship with the second magnet component ring, wherein each stator pole element of the plurality of stator pole modules is approximately co-extensive axially with the first magnet component ring and the second magnet component ring, with the rotor configured and mounted for rotation around the motor axis.

In accordance with example embodiments of the present invention, a rotor assembly for a permanent-magnet-on-rotor electric motor comprises a rotor component configured to rotate about a motor axis, an inner magnet component ring, comprising a first radius extending from the motor axis, a plurality of rotor magnet poles that are magnetized radially, and an inner back-iron component ring connected to an inside of the inner magnet component ring proximal to the motor axis, and an outer magnet component ring, configured and disposed to be similar, concentric and parallel to the inside magnet component ring, and comprising a second radius extending from the motor axis, a plurality of rotor magnet poles that are magnetized radially, and an outer back-iron component ring connected to an outside of the outer magnet component ring distal to the motor axis, wherein the inner magnet component ring and the outer magnet component ring are both facing and magnetized in an aiding relationship comprising a north outward facing pole on the inside magnet ring facing the motor inside air gap and a south inward facing pole on the outside magnet ring facing the outside motor air gap alternating reverse magnetized poles on circumferential adjacent rotor magnet poles proceeding around the rotor assembly.

In accordance with aspects of the present invention, the outer back-iron component ring may be configured and disposed in a flux conducting relationship with the inner back-iron component ring across top distal surfaces of the outer back-iron component ring and the inner back-iron component ring, so as to be mounted for rotation about the motor axis.

Further objects of the invention will, in part, be obvious and will be depicted hereinafter. The invention, accordingly, comprises the apparatus possessing the construction combination of elements and arrangement of parts which are exemplified in the following detailed description.

BRIEF DESCRIPTION OF THE FIGURES

These and other characteristics of the present invention will be more fully understood by reference to the following detailed description in conjunction with the attached drawings, in which:

FIG. 4 depicts a diagrammatic illustrative example perspective view of a typical laminated stator for a standard technology internal gap brushless motor;

FIG. 5 depicts a diagrammatic illustrative example perspective view of a vertical stator Petersen type brushless motor showing shaped height stator poles;

FIG. 6 depicts a diagrammatic illustrative example perspective view of a single stator pole iron-based core element of a brushless motor of the invention;

FIG. 7 depicts a diagrammatic illustrative example perspective view of a complete stator pole array of the individual stator pole iron based core elements for a motor of the invention;

FIG. 8 depicts a diagrammatic illustrative example perspective view of an alternate construction of the stator pole iron based core element with a break-away showing a single lamination of that individual stator pole;

FIG. 9 depicts a diagrammatic illustrative example perspective view of the alternate stator pole architecture of FIG. 8 employing an alternate construction;

FIG. 10 depicts a diagrammatic illustrative example perspective view of an individual stator pole iron based core element of the invention prior to assembly into a complete stator assembly array;

FIG. 11 depicts a diagrammatic illustrative example perspective view of a bobbin embodiment for the individual stator pole of FIG. 10;

FIG. 12 depicts a diagrammatic illustrative example perspective view of the wound individual stator pole iron based core element prior to assembly into a complete stator assembly array;

FIG. 13 depicts a diagrammatic illustrative example perspective view of the complete stator assembly array of individual wound stator pole modules mounted on a suitable insulative surface;

FIG. 15 depicts a diagrammatic illustrative example perspective view of two back iron component rings with attached twin magnet rings shown in relative position to each other for a motor of the invention;

FIG. 16 depicts a diagrammatic illustrative example perspective view of a complete rotor assembly structure of the invention;

FIG. 18 depicts a diagrammatic illustrative example perspective view of another motor employing the construction and architecture of the invention;

FIG. 19 depicts a diagrammatic illustrative example perspective view of the array of individually wound stator pole modules placed on a circuit board for the motor of FIG. 18;

FIG. 20 depicts a diagrammatic illustrative example cross section internal view taken through the center of opposite individual stator poles of the complete motor of FIG. 18;

FIG. 21 depicts a diagrammatic illustrative example perspective view of another motor employing the construction and architecture of the invention;

FIG. 22 depicts a diagrammatic illustrative example perspective view of the array of individually wound stator pole modules placed on a circuit board for the motor of FIG. 21;

FIG. 23 depicts a diagrammatic illustrative example cross section internal view taken through the center of opposite individual stator poles of the complete motor of FIG. 21;

FIG. 24 depicts a diagrammatic illustrative example perspective view of an alternate embodiment version of the motor of the invention;

FIG. 25 depicts a diagrammatic illustrative example perspective view of the individual stator pole modules placed on a circuit board with the addition of a stator flux conducting ring for the motor of FIG. 24; and FIG. 26 depicts a diagrammatic illustrative example cross section internal view taken through the center of opposite individual stator poles of the complete motor of FIG. 24.

DETAILED DESCRIPTION

Figure 1:
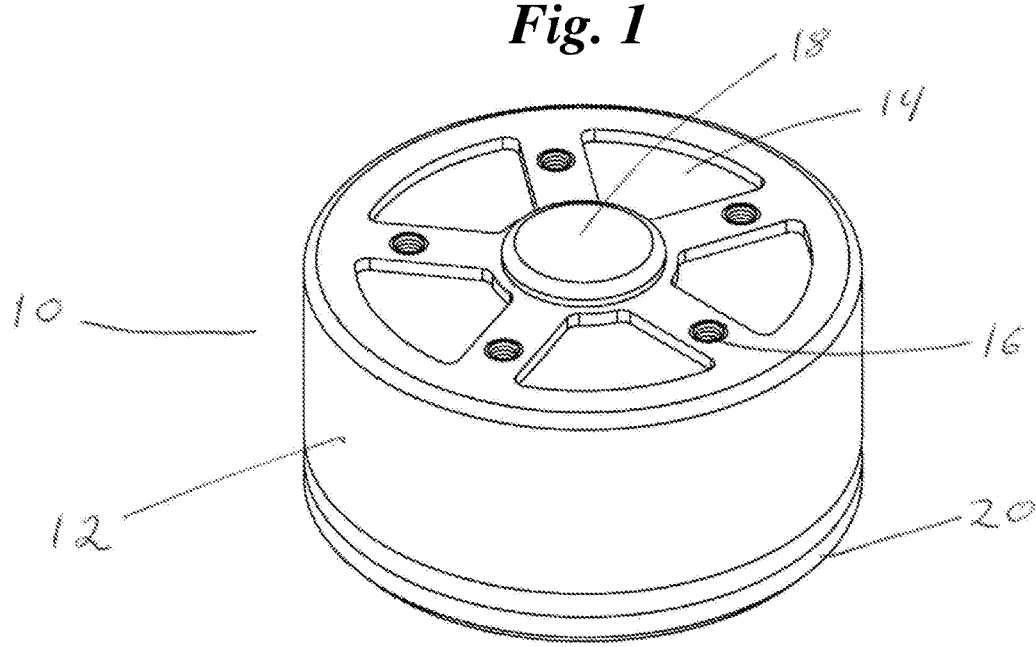
FIG. 1 depicts a diagrammatic illustrative example perspective view of a motor employing the construction technique and architecture of the invention.

An illustrative embodiment of the present invention relates to a twin radial air gap permanent-magnet-on-rotor brushless motor with two magnet rings and a stator comprised of individual iron-core-based stator pole modules that each contain a wound stator pole element with outward facing and inward facing radial pole surfaces, co-planar with the two magnet rings across the twin radial motor operating air gaps suitable for transforming electrical energy into mechanical work in a more efficient manner because the improvement in the twin radial air gap flux field patterns aid rather than oppose other relevant elements, which improves air gap flux performance, where re-forming of the stator into individual smaller flux conducting stator pole modules enhances assembly, significantly reduces iron losses and reduce sizes and weight in the overall motor design.

FIGS. 1 through 26, wherein like parts are designated by like reference numerals throughout, illustrate an example embodiment or embodiments of the twin radial air gap permanent-magnet-on-rotor brushless motor assemblies, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

The twin radial air gap permanent-magnet-on-rotor brushless motor presented in the invention depicted in the drawings significantly improves overall motor performance, weight and size, as well as advancing manufacturing processes for this class of electric motors than can range from fractional to integral horsepower ratings. This power range is highly suitable to modern automotive, appliance and heating and air conditioning applications bringing also the programmability so much in demand in these growing and modern industries. High power density, low weight and improved efficiency and the ability to integrate the basic stator manufacturing process into the same assembly process as used for the advanced electronic control systems assembly provides integration capabilities not available before for electric motors of this size and power range. This assembly process also gives the OEM manufacturer the chance to integrate the motor manufacturing into their internal assembly process reducing costs and giving the OEM greater control and individuality in product presentation. The stator pole by stator pole individual capability to eliminate or significantly reduce the non-torque component of force present in an energized stator pole air gap, typically present in single air gap permanent magnet brushless motors, further enhances the use of non-standard rotor pole to stator pole combinations in the TwinGap architecture that brings other benefits such as smoother running and more controllability. These and other features of this motor architecture will become evident in the detailed description.

FIG. 1 illustrates a medium size and power brushless permanent magnet ("PM") motor of the TwinGap architecture represented generally at 10. Motor 10 is configured as a fixed shaft, rotating hub type motor and could find application as the internal hub for an attached fan impeller for use in HVAC applications. As such the hub or basic rotor component is represented at 12 and is typically formed of an engineering plastic material. Depressions 14 on the top of the hub are used to reduce material and cross section in the molding process. Mounting holes for the fan impeller are at 16 and a plastic cover, covering the fixed shaft and bearing assembly is shown at 18. The base of the motor that is fixed and typically fabricated from aluminum is shown at 20.

Figure 2:
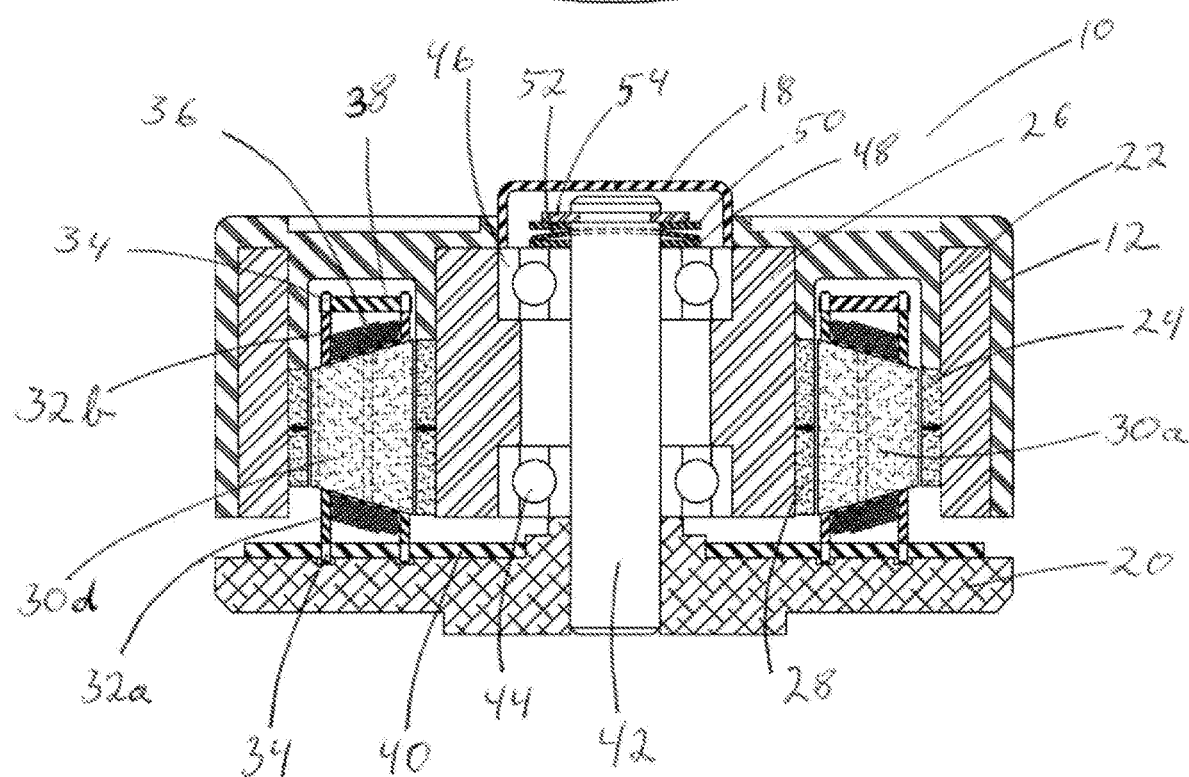
FIG. 2 depicts a diagrammatic illustrative example section view taken through a 160 degree section in FIG. 1 centered on the motor stator poles.

In FIG. 2, the motor 10 is shown in a cross section internal view taken through the centers of two of the stator poles. The angle of the cross section in this case is 160 degrees. Viewing the rotor assembly, note the hub or basic rotor component is shown in section view at 12. This rotor component encloses and locates the basic TwinGap construction internal rotor components containing two magnet component rings and two soft magnetic back-iron component rings (hereinafter back-iron component rings) juxtaposed in facing or confronting relationship. First and outermost note the outside back-iron component ring at 22 and the attached magnet component ring at 24. Next note the inner back-iron component ring at 26 and the attached magnet component ring at 28. The magnet rings are magnetized in aiding relationship with a north outward facing pole on the inside magnet ring 28 facing the motor inside air gap and a south inward facing pole on an outside magnet ring 24 facing the outside motor air gap. This reverses on circumferential adjacent rotor magnet poles when proceeding around the rotor. In this embodiment the motor 10 is constructed with eight alternating magnet poles on each magnet ring and nine stator pole modules. The magnet rings can be fashioned as segments instead of continuous rings and glued to the back-iron component rings 22 & 26, or if the magnet rings are of plastic molded construction they can be molded directly on the back-iron component rings and potentially magnetized in the same process step. This process can also include the basic rotor component 12 co-molded or molded in a second step of the rotor assembly fabrication process. The back-iron component rings 22 & 26 provide a low reluctance path for the back side or non-motor air gap side of the two magnet component rings 24 & 28. They also supply a magnetic return path for the stator pole coil modules. In an alternate embodiment the two back-iron component rings can be magnetically connected or common across the top portion of the rotor assembly over the top of the stator pole modules. The magnetic portion of the stator is comprised of nine individual stator pole modules which are attached to circuit board 40, centered in the radial distance between the inner facing outer magnet ring and the outer facing inner magnet ring and centered around a shoulder in the base 20 first referenced in FIG. 1. Each stator pole module is comprised of an iron-based core element shown here as 30a and 30d, two of nine, with an outward facing radial surface abutting the motor outside air gap and facing in a co-planar fashion magnet component ring 24 and an inward facing radial surface abutting the motor inside air gap and facing in a co-planar fashion magnet component ring 28. The iron-based core element radial majority length between the inner and outer radial surfaces is protected with an insulative bobbin shown at 32a & 32b. Bobbin components 32a & 32b are molded with protruding pins shown at 34. The pins on the lower half are used to locate and fasten the stator pole modules in a circular array on the circuit board 40 which is centered on the locating shoulder on the base 20. In this embodiment the bobbin pins on the top half are used to locate an upper structural insulative flat ring 38 that helps secure the top side of the stator modules in place as a circular array. Contained on each bobbin structure 32a & 32b located radially around said iron-based core elements are individual coil windings represented at 36. Each winding is connected to or terminated (not shown) on circuit board 40 which in turn interconnects the individual windings, now considered stator pole modules, in the designated winding pattern for the particular motor design rotor pole/stator pole configuration corresponding to a basic electrical design requirement of the permanent-magnet-on-rotor electric motor apparatus. The basic electrical design requirement is defined as a design parameter indicating number and placement of elements designated by the basic motor electrical design requirements including number of phases, number of stator poles and rotor poles, and electrical circuit drive methodology. Typically, the stator pole iron-based core elements, hereinafter referred to as stator pole elements may be formed of a pressure shaped soft magnetic composite material (SMC), for example, supplied by Höganäs AB as Somaloy material. Note the tapered design of the stator pole elements with a larger inside vertical height and a shorter outside vertical height. The purpose is to create balanced energized force vectors in the inner and outer motor air gaps during motor operation to obtain results noted in the introductory paragraph above. Note that in the shaft and bearing assembly of the subject motor, the shaft 42 is fixed in the base 20. The shaft supports two ball bearings 44 & 46 with the outside and spinning surface of the bearings nesting in notches on the inside surface of inside back-iron component 26. The spaced apart bearings are loaded via a spring assembly consisting of washers 48 & 50 and cup washer loading spring 52 noted on the top side of the top bearing 46. The loaded bearing assembly is held in place by a shaft e-ring shown at 54. As noted above the load is applied to the motor spinning rotor directly with no direct connection to the motor shaft.

Figure 3:
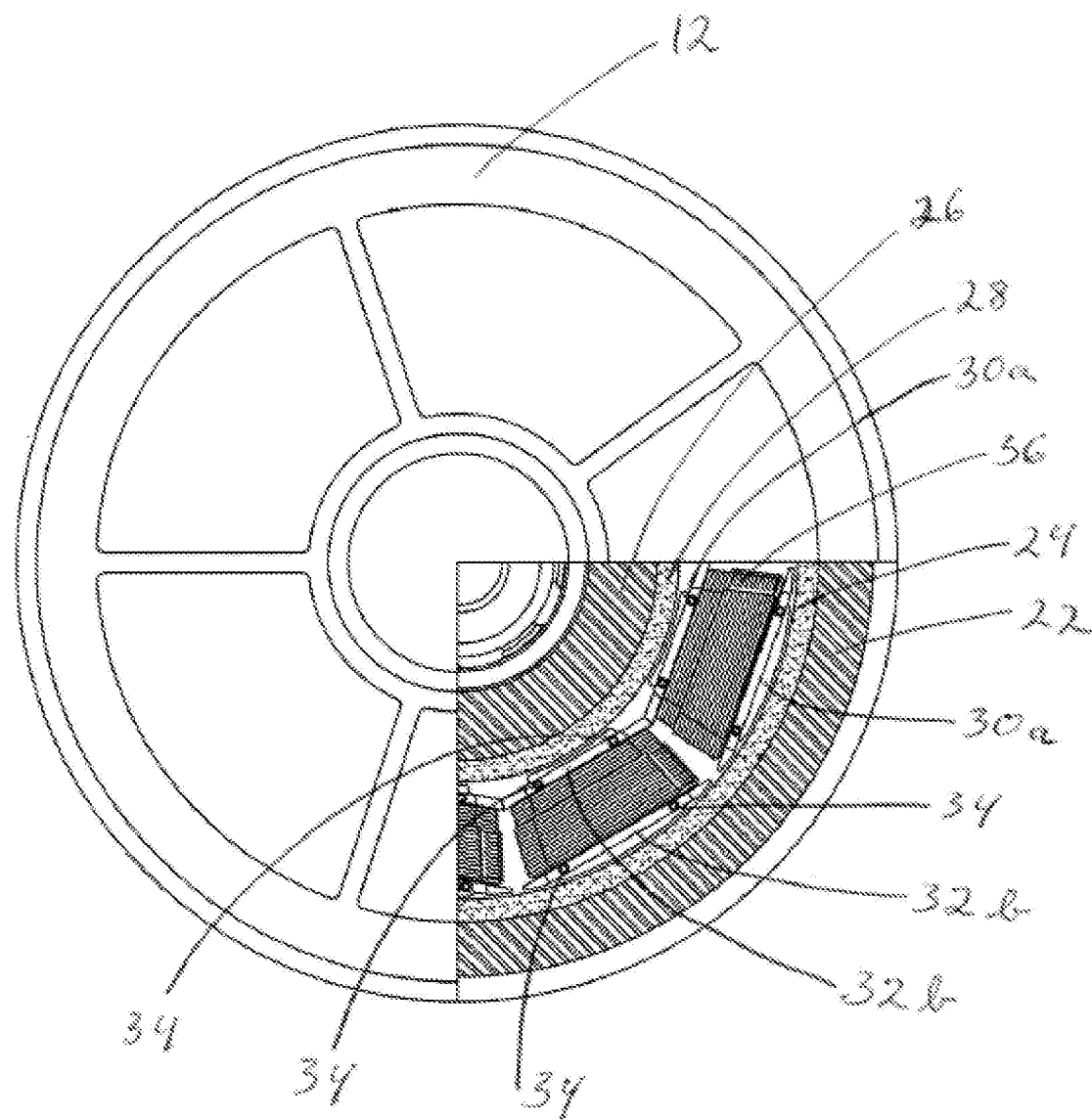
FIG. 3 depicts a diagrammatic illustrative example top side view of the motor of FIG. 1 with the motor load mounting holes removed and showing a 90 degree cut-away depicting internal construction of the motor.

FIG. 3 is a top view of motor 10 with a cut-away section depicting the internal construction from this perspective. Rotor hub 12 is shown in simplified form without including the load fastening mounting holes previously represented at 16. As can be seen in this view, outer back-iron component ring 22 is now visible from the top side as well as inner back-iron component ring 26. Attached to those rings are outer magnet component ring 24 and inner magnet component ring 28. Now visible from the top side are the stator modules. Note, each module is physically independent as shown. The outer and inner visible portions of the stator pole element shown at 30a radially facing the outer and inner magnet component rings across the motor outside and inside air gaps. Note the circumferential extent of the outer surface vs. the inner extent. The angle from the motor centerline is approximately the same resulting in the longer circumferential length facing the outside air gap. This coincides with the opposite vertical extent of these pole surfaces in the side section view of FIG. 2. For a better understanding, FIG. 6 and FIG. 7 depict the stator pole element in isometric form. FIG. 3 also depicts the outside walls of the top bobbin component of a stator pole module at 32b with the top side pin extensions at 34. For clarity the structural insulative flat ring 38 is not shown in this view. This then allows a top side view of the individual stator pole module windings shown, for example, at 36. Note that the individual stator pole modules are sized to fit within the radial extents between the outer and inner magnet component rings and co-located with the rotor around the center fixed motor shaft on the motor centerline. Also, again note as shown in FIG. 2 that the radial surfaces of the stator pole element are sized to be co-planar with and have a vertical extent similar to the vertical extents of the relative magnet component rings outside and inside as was seen in FIG. 2.

Now moving to FIG. 4, shown in perspective form at 56, is the basic stator for a standard technology, inward facing, internal permanent-magnet-on-rotor brushless motor. This is also shown having nine stator poles, one shown at 58a, but formed as an assembly of stator planar laminations each approximately 0.5 mm thick. Pole 58a is interconnected with the eight other stator poles as one stamped part which are then stacked to form a complete basic stator. All individual stator pole laminations are stamped as part of a complete circle containing and magnetically connecting all the stator poles on one side of the stator pole winding which would, for example, be present in the depressions 60a formed between the inner radial extents of each pole, one shown at 62a, and the common outside magnetic return path 64. In a 3-phase design this form of brushless motor would normally be designed with a six or twelve pole permanent magnet rotor so that mechanically balanced operation is possible under activation. Eight or ten magnet poles are possible but these would result in significant radial unbalance forces under operation offsetting the desirably smoother mechanical detent operation and energized performance that would otherwise be available with these magnet rotor pole options.

FIG. 5 shows at 66 a comparable basic vertical stator formed of soft magnetic composite (SMC) material discussed earlier in FIG. 2. This type of stator and motor construction is indicated in Petersen U.S. Pat. Nos. 6,617,747; 6,707,224 and 7,598,649. Please refer to these patents for a more detailed description. In FIG. 5 the basic stator is depicted as a twelve-pole stator and maintains, as in FIG. 4, the common base element 68 which interconnects all twelve stator poles (a-m), one shown at 70a. The winding for each pole would typically be formed on a bobbin and fitted down over each pole on the bottom half of the pole as shown at 72 and either wound individually before assembly or wound as an assembly. In this embodiment, as indicated in the listed patents, the stator pole extends above the individual stator pole winding exposing an inner and outer radial pole surface, for example shown at 74 and 76. This type of motor can be configured as either an inside rotor only, utilizing stator pole face area 76 or as an outside rotor only utilizing stator pole face area 74 or as both an inside and outside (dual gap) design utilizing both pole surfaces 74 & 76. This type of vertical stator design opened up a variety of design options and, with the dual gap version, could give higher power densities with the ability to configure the inner and outer pole surface areas to be reasonably close to matching yielding balanced energized force vectors at the individual stator pole described in conjunction with the current invention. Using the SMC material, the stator can be formed and pressed as a one-piece structure or as an assembly as described in the relevant patent.

Although offering significant advantages this form of stator design and construction required large presses to single piece configure a stator such as shown in FIG. 5 and presented some significant pressing problems. The stator pole face area confronting the magnet ring(s) on the rotor is formed as an extended area of the pole above the winding area which increases stator material and total vertical height of the stator pole which then has a limiting effect on pressing plus that increased height increases stator inductance, a limiting factor in motor performance. Another limiting factor in the double gap magnet ring design is the individual magnet poles on the inner and outer magnet rings have to be configured with opposing magnet poles, north facing north, south facing south. This tends to knock down the magnet fields and makes magnetization as an assembly difficult.

Going to FIG. 6 an individual stator pole element of the present invention is depicted in perspective at 78. This form of motor stator construction is principally focused on a TwinGap architecture dual air gap approach but can also be set-up for use as a single gap design for lower power motor applications. Since the majority of brushless motor applications used in both fractional and integral horsepower applications are of three-phase design configuration the descriptions which follow will fit most appropriately with a three-phase motor design. This depicted motor construction is based on using a rotor with twin parallel radial ring-shaped magnet structures surrounding a stator structure comprised of individual stator pole modules with an outward facing and inward facing radial confronting pole surface facing the rotor magnet rings. Maximum utilization of that approach is when both air gaps can be as close as possible radially with the resulting mechanical force being produced in each air gap being as equal as possible in both phase angle and magnitude. In any electric motor the torque is a product of a force at a distance. A force is produced by the magnetic interaction of the stator coil field and rotor permanent magnet field in the air gap(s) and the radius to the air gap from the center of rotation is the distance. The force is expressed as a vector in space in the air gap and the component of that force vector that is tangent to the air gap radius is what produces torque. Depending on the angular relationship of the permanent magnet polar fields to an individual stator pole the force vector produced as a result of an energized stator pole coil field varies from a vector that has both a tangent component and a radial unbalance component to a pure tangent force at the ideal point and back to a vector that has both a tangent component and a radial unbalance component during the angle of rotor rotation between motor communication points. There can also be an axial component to that force vector that is never productive to generate torque and further discussion is not significant in this motor architecture as described. With the TwinGap architecture form of construction the force vector produced in the outside air gap of an energized stator pole is generally designed to be equal to the force vector produced in the radially opposite inside air gap. The difference being that the unbalance component produced in the outside air gap is equal and opposite in direction (inward facing or outward facing) to the unbalance component produced in the inside air gap. This then results in substantial cancellation of the unbalance force components occurring at an individual energized stator pole. As defined earlier and shown in the motor of FIG. 1, those unbalance force components are substantial canceled due to the TwinGap architecture resulting in a permanent-magnet-on-rotor brushless motor with a very smooth energized torque vs. the rotor angle of rotation at most any level of rotor load and therefore motor current. In that embodiment the mechanical detent or cogging torque due to the interaction of the rotor permanent magnet fields with the stator pole modules in a non-activation state is reduced to a very low level due to the non-typical use of an eight-pole rotor with nine stator pole modules. This combination would normally result in an energized rotating unbalance force component in a single gap design, but due to the TwinGap architecture with shaped stator pole elements, as shown in FIG. 6 and shown combined in FIG. 7 as 78a thru 78i, the unbalance force components of the complete motor are reduced or eliminated as demonstrated in the above discussion.

Another feature of the individual stator pole element as shown in FIG. 6 and FIG. 7 is the tapered form of construction of the individual pole. Note the diverging shape of the sides of the stator pole element which connects the co-planar inward facing radial pole surface with the outward facing radial pole surface maintaining approximately the same pole angle from inside to outside. This is done so the confronting rotor magnet polar surfaces change polar direction at approximately the same rotor angle when confronting the individual stator pole inside and outside radial surfaces. In order to maintain approximately the same stator pole element radial surface areas desirable to reduce the unbalance force components the outside facing pole surface must be shorter in vertical extent which results in the decreasing slope taper on the top and bottom surfaces of the individual stator pole element when proceeding from inside to outside. This TaperPole form of construction creates a uniformly changing shape while maintaining a mostly constant cross section area as one proceeds from the inward facing radial pole surface shown at 80b in FIG. 7 to the outside facing radial pole surface shown at 82g in FIG. 7. This generally uniform but variable cross section shape keeps flux loss to a minimum in the stator pole improving efficiency and giving maximum radial winding length. As in all permanent magnet (PM) motors, especially those containing very high energy permanent magnets, care must be taken in sizing all the other magnet material components to prevent saturation in those components which would limit motor performance especially near the design performance limits. Because of the uniformly changing pole element shape there are no sharp bends or "choke" points in the TaperPole construct to inhibit the flow of flux from either the permanent magnets or the energized coil windings as in typical brushless direct current (BLDC) motor designs. The magnitude of permanent magnet flux is generally greater than the energized field flux and by using the pole element cross-section area one can calculate the flux level or density required to be carried by the pole element using material specifications for the magnet material and the motor designed air gap and magnet thickness which defines an operating load line for the permanent magnet material. The projected air gap flux density can also be used to project material cross section requirements in other parts of the magnetic circuit such as the back-iron components. Also, using the maximum designed motor current and the turns of wire on an individual field coil plus the motor operating air gaps and other air gaps to the potential return path to the coil circuit one can make an approximation of the maximum coil generated flux using the material characteristics of the stator pole element and other magnetic conducting materials in the magnetic circuit. That coil circuit flux does not occur when maximum permanent magnet flux is present in the body of the pole element, only at the individual ends of the pole element. This allows the relevant components to conduct magnetic flux of the permanent-magnet-on-rotor electric motor at a rated threshold that can be set to a rated maximum operating voltage and current.

Moving to FIG. 8 an alternate form of construction of the stator pole element is depicted at 84. This embodiment also maintains the relatively equal outside and inside radial pole surface areas and the angle from the motor centerline which defines the circumferential extent of the outside and inside pole surface areas as was shown in FIG. 6. This approach uses a basic square or rectangular pole cross section shape remaining constant as one proceeds from the inside radial pole surface 86 towards the outside radial surface 88 for the majority of that radial distance and then the vertical extent is reduced and the circumferential extent is expanded rapidly in a flare shape. The vertical extent of the pole comprising the flare portion is formed of stamped motor lamination material in a stacked arrangement shown at 90 with an individual lamination shown at 92. The end caps shown at 94a and 94b are formed of a soft magnetic composite material as previously discussed.

FIG. 9 depicts the same shape construction at 96 but the entire pole is formed of the soft magnetic composite material. The pole shapes shown in FIG. 8 and FIG. 9 can have advantages in some motor designs based on the TwinGap architecture. The motor could also be fabricated just using the laminated steel portion of the stator pole shown in FIG. 8 if equal inside and outside pole surface areas are not necessary or desirable in certain applications.

FIGS. 10 through 17 illustrate the basic assembly steps for the stator assembly and rotor assembly of the principal example motor utilizing the TwinGap architecture. FIG. 10 starts out portraying in a perspective view a stator pole element at 98 similar in shape and size to the stator pole element 78 from FIG. 6. On to that stator pole element are inserted two bobbin halves represented in perspective view in FIG. 11 as shown at 100a and 100b. Note the bobbin shape is molded to conform to the TaperPole stator pole element shape plus there are a number of pin extensions to the bobbin walls shown generally at 102. Alternatively, the bobbin could be directly inserted molded on the stator pole element. After the bobbin halves are inserted onto the stator pole element the resulting insulated stator pole element is wound with a field winding shown at 104 in FIG. 12 in perspective view. This now comprises a stator pole module. The winding electrical terminals for the field coil are not shown to simplify the view and show basically the mechanical assembly process. Now moving to FIG. 13 a complete assembly of nine stator pole modules for this motor design is shown in perspective at 106. Each stator pole module is assembled onto a circuit board represented at 108. An individual stator pole element inside facing radial pole surface is shown at 110 and an individual stator pole element outside facing radial pole surface is shown at 112 as part of the assembly. The bobbin wall pins described in FIG. 11 are used to locate and fasten or mount the modules in a circular array into holes on the circuit board located around the motor centerline or axis. The electrical terminals generally either thru-hole or surface mount connect electrically to the electrical traces on the circuit board which could then electrically interconnect the stator assembly with the electrical control circuit for the motor on that same circuit board as can be horizontally extended in this view. The circuit board extent here in FIG. 13 is reduced in extent for simplicity purposes. Those electrical connections are not shown since the motor architecture is the principal invention but one skilled in the art can see how the individually small stator pole modules can be assembled via automatic insertion or surface mount placement techniques onto the circuit board which could contain the electrical components of the motor control system. As described, no electrical connectors or later step assembly are required to bring the motor and motor control circuit board together into a completely assembled operational motor system.

Figure 14:
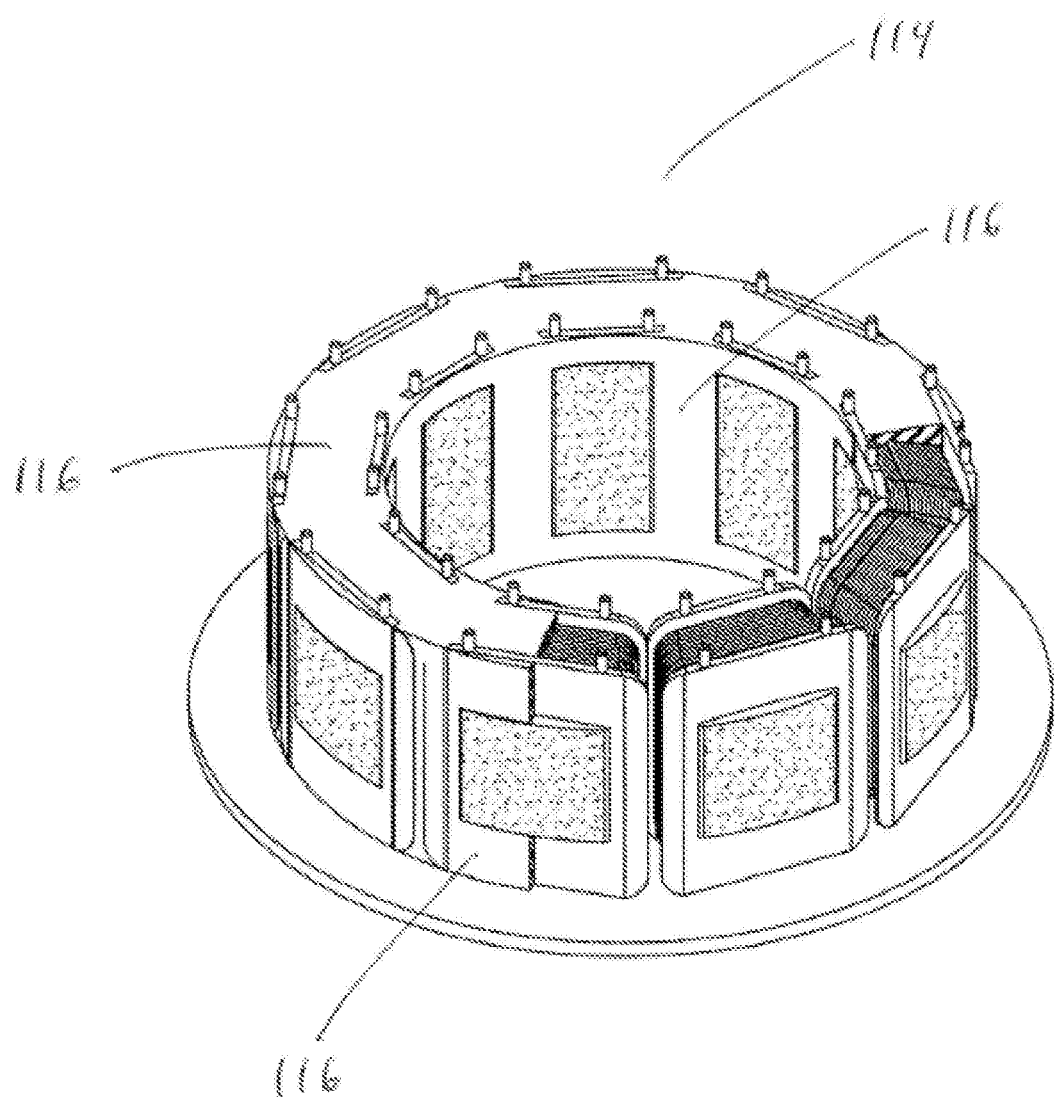
FIG. 14 depicts a diagrammatic illustrative example perspective view of the stator assembly of FIG. 13 with a further step of over-molding the entire stator assembly and including a cut-away section to aid in clarity.

FIG. 14 shows in perspective form the same stator assembly shown in FIG. 13 but with the additional step of over molding the stator assembly to form it into a rigid one-piece circular ring depicted at 114. It is shown in cut-away form to depict the internal individual stator pole modules. Note the actual encapsulating plastic shown variously at 116. This method of fastening the individual stator pole modules into a single ring is preferable to the upper structural flat ring installed on the upper bobbin wall pin extensions previously shown at 38 in FIG. 2.

Now moving to the rotor assembly, rotor inner and outer back-iron and magnet ring components are shown in cut-away perspective view at 118 in FIG. 15. The outside magnet back iron component ring is shown at 120 and the attached outside magnet component ring is shown at 122. The inside back iron component ring is shown in spaced relationship at 124 with the accompanying inside magnet component ring shown at 126. Note the magnet rings are shown magnetized as adding in series with this form of architecture.

Now moving to FIG. 16, a complete rotor assembly is shown in a cut-away perspective view at 128. As depicted, if the magnet rings are formed of a plastic molded permanent magnetic material the rings can be directly molded in place on the respective back iron component rings and further they can be molded in place and magnetized radially in a single or two step molding operation that could possibly include the basic rotor component. Again, the basic rotor component is generally formed of an engineering plastic material and is shown at 130 with the load mounting screw holes shown at 132. The magnet component rings 122 & 126 are shown with the same numbers as identified in FIG. 15 as are the two back-iron component rings 120 and 124. Note the vertical extent of the outside magnet ring is substantially shorter than the inside ring coinciding with the explanation given earlier to match the outside and inside stator pole element radial outside and inside surface areas. As noted before, this is not a required feature of the invention but is highly desirable if the motor design calls for elimination of energized radial unbalance forces on a stator pole by stator pole basis which is desirable in this nine pole stator, eight pole rotor motor configuration shown. The inside back iron component is shown with a spaced apart top and bottom depression shown at 134 and 136 so they may receive the outer race of the two ball bearings shown in the complete assembly next exposed in FIG. 17.

Figure 17:
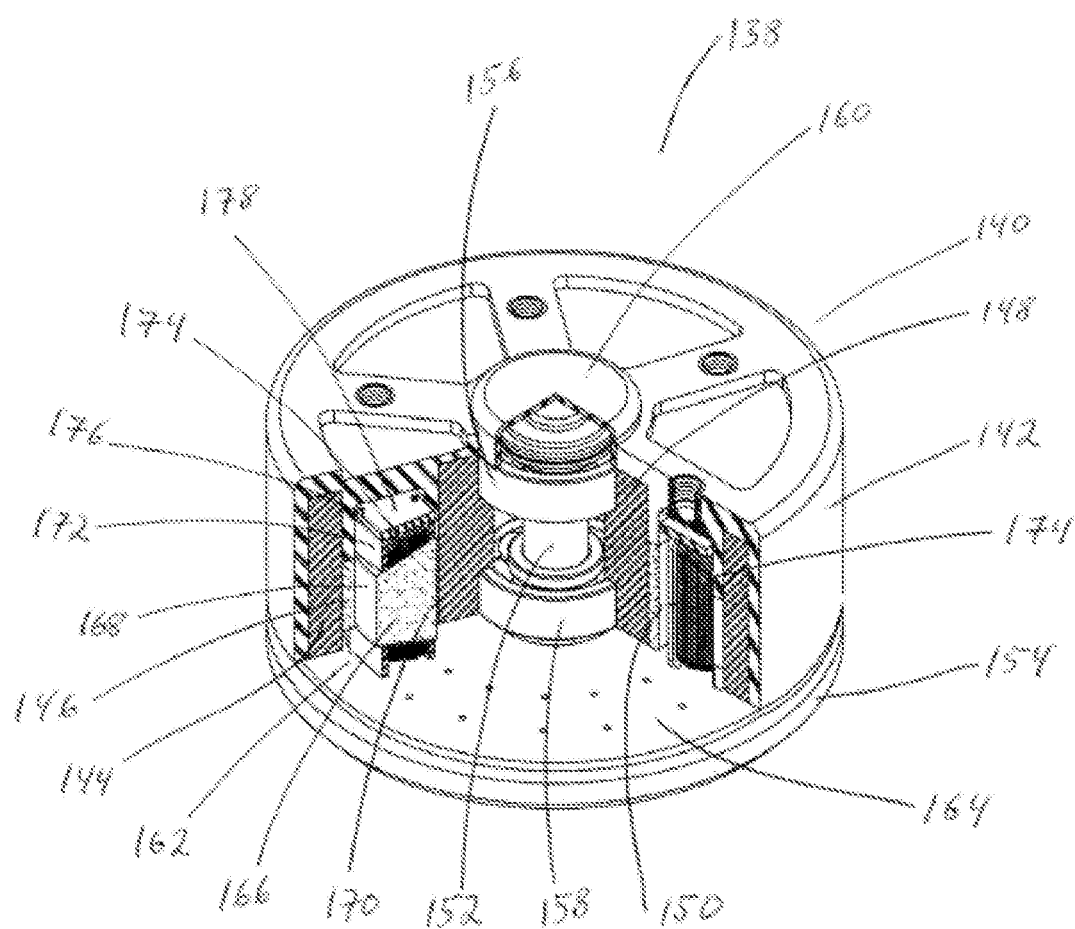
FIG. 17 is a perspective view with a cut-away to show a complete motor of the invention represented in component and sub-component parts from FIG. 10 to FIG. 16 plus the addition of the bearing and shaft assembly components.

FIG. 17 shows, in cut-out perspective view, basically the same motor as shown in section view in FIG. 2 here defined at 138. The complete rotor assembly of motor 138 is generally shown at 140 and the basic rotor component is shown at 142 and is seen in section enclosing and supporting the outside back-iron component ring shown at 144 with the attached outside magnet component ring shown at 146 plus the inside back-iron component ring shown at 148 with the attached inside magnet component ring shown at 150. The rotor assembly is mounted for rotation around shaft 152 which is press mounted in the motor base shown at 154 and is supported via bearings shown at 156 & 158. Above the top bearing 156 there are shaft washers capturing a bearing loading spring and a shaft e-ring capturing the loaded bearing assembly in place on the shaft. Because of the restricted view these parts are not labeled here but are shown in more detail in the section view drawing of FIG. 2. Enclosing that shaft and bearing loading assembly is a top cap or cover shown at 160 and also as seen in FIG. 1 at 18. Now going to the stator assembly shown basically at 162 here and in FIG. 13 at 106 plus alternately shown in encapsulated form at 114 in FIG. 14. Again, note that the entire stator assembly containing (in this embodiment) the nine stator pole modules is enclosed under the rotor assembly with the stator pole elements outside and inside radial surfaces co-planar with the outside and inside magnet component rings of the rotor assembly and with approximately matching vertical height. Generally, the vertical extent of the two magnet rings slightly overlap the matching stator pole elements vertical radial surface extent. The stator assembly also includes the surface mounting plate for the individual stator pole modules which is likely but not required to be a circuit board shown at 164 and as originally shown in FIG. 13 at 108. The general requirement is that it be an insulative surface which could alternately have a flex circuit or other means that would electrically interconnect the individually wound stator pole modules. Referring to the section of an individual stator pole element shown at 166 with an outside radial pole surface shown here at 168 and also in FIG. 13 at 112, the outside vertical extent of that surface confronting the outside magnet component ring described previously at 146 through the outside motor air gap and in turn the inside vertical extent shown at 170 confronting the inside magnet component ring previously described at 150 through the inside motor air gap. The bobbin covering the majority of the radial extent of the individual stator pole element is shown at 172 with the bobbin walls containing the individual pole winding shown at 174 at different locations. The pin extensions of the bobbin walls used for locating and mounting each stator pole component are shown here at 176 and also in FIG. 11 at 102. In this FIG. 17 view the top side of each of the stator pole modules is secured at 178 with a flat washer shaped insulative ring as was also shown in FIG. 2 at 38. The pin extensions of the bobbin walls are only one of what can be many ways of securing the stator pole modules to the circuit board or insulative surface shown at 164. As discussed, encapsulation or over-molding of the complete stator pole module array as described in FIG. 14, may be the preferred method of both securing the stator modules in place on the mounting surface and locating them relative to the motor centerline as well as mechanically interconnecting the array in a rigid circle. Also, the surface mounting plate or equivalent circuit board 164 could easily extend diametrically outside the confines of the rotor assembly to include other motor control circuit components and functions of this permanent-magnet-on-rotor brushless motor.

In FIG. 18 an alternate version of the TwinGap motor architecture is shown at 180. In this alternate construction the motor is configured with a rotating shaft output, the back side of which is visible at 182. The motor cover is shown at 184 with external cover mounting bosses shown variously at 186 which are used to secure the cover to motor base shown at 188.

In FIG. 19 the stator assembly for motor 180 is shown at 190. The mounting plate or circuit board for the stator pole modules is shown at 192. The eighteen stator pole modules, a-r, are visible and shown mounted to the circuit board, the first of which is shown at 194*a* and finishing with 194*r*. One of the eighteen stator pole element inside radial surfaces is shown at 196*a* and an outside radial surface is shown at 196*j*. One of the eighteen bobbins covering the majority of the radial extent of each stator pole element is shown at 198*k* and one of the eighteen stator pole module windings is shown at 200l.

Going to FIG. 20 the motor 180 from FIG. 18 is depicted in section view, shaft 182 is now completely visible and motor cover 184 is now depicted in section along with the cover mounting bosses, one visible at 186. The motor base, typically formed of aluminum, or in this larger motor size it can be a base metal or aluminum casting, is now shown in section at 188. The stator assembly 190 from FIG. 19 is generally shown here in section and the mounting plate or circuit board 192 is also shown in section. One of the stator pole modules is shown in section view at 194 along with the accompanying iron-based stator pole element shown here in two locations at 196, along with the module bobbin shown at 198 and the winding for said module at 200. In this embodiment the stator modules are secured in place on the top side with the upper structural flat ring shown at 202. Note here, as in the previous embodiment, the stator assembly is mostly enclosed by the rotor assembly shown here generally at 204. Said rotor assembly which includes the basic rotor component shown at 206 partially surrounds and locates the inside magnet back-iron component ring shown at 208 with the attached inside magnet component ring shown at 210 in juxtaposed relationship through the inside motor air gap to the inside radial surface of stator pole element 196. Similarly, basic rotor component 206 locates the outside magnet back-iron component ring shown at 212 which is secured by screws to the basic rotor component, one visible at 214. Said outside back-iron component ring with attached outside magnet component ring shown at 216 in juxtaposed relationship through the outside motor air gap to the outside radial surface of stator pole element 196. Rotor assembly 204 is directly mounted to shaft 182 and supported for rotation by bearings shown at lower bearing 218 and top bearing 220, the top bearing outside race fixed in the motor cover 184 and the bottom bearing outside race fixed in motor base 188. Note the shoulder in base 188 shown at 222 which centers the stator modules 194 and locates circuit board 192 relative to the center of rotation and the screws, shown at 224, secures the circuit board to base 188. Also note the screws, one shown at 226 which secures the cover 184 to the base 188. In order to pre-load the bearings there is a shaft spacer shown at 228 which in combination with washer 230 and loading spring 232 pre-loads the bearings to the desired specification. In this eighteen-pole stator module configuration the unwanted radial force components that occur in a single pole air gap are theoretically all cancelled when summed over 360 degrees for a three-phase motor design like shown in this embodiment when using any of the possible rotor magnet pole combinations with the eighteen-pole stator but uneven distribution of the air gap distance between the stator assembly and the rotor assembly can still cause some unbalance issues. The TwinGap architecture design approach helps the motor become more stable with regard to that air gap variation which would otherwise result in an unbalance issue.

Now moving to FIG. 21, a smaller, lower power TwinGap architecture motor is shown in perspective at 234. Note the basic rotor element, shown at 236 in this configuration, is the rotating external load driving portion of the motor. Included is a spur gear formed portion at the top center shown at 238 which is meant to engage the actual load as likely presented through a gear train. Also shown is the circuit board or mounting plate portion of the stator assembly shown here at 240. The outer ring portion of the rotor assembly is actually the outside magnet back-iron component ring portion of the rotor assembly shown here at 242.

Moving to FIG. 22 we see the stator assembly depicted generally at 244 prior to over-molding. The circuit board is again evident at 240 as in FIG. 21. Attached to the circuit board in a circular array around the motor centerline are six stator pole modules shown here at 246a and 246f. Each stator module contains a stator pole element, one labeled at 248a that exhibits an inward facing radial surface, one shown at 250f and an outward facing radial surface, one shown at 252c. One of the six stator pole module bobbins is shown at 254d and the winding for that stator pole module is shown at 256d.

In FIG. 23 the motor 234 from FIG. 21 is shown in section. In this view the basic rotor element 236 as well as the spur gear extension 238 are evident in section view. The base of the motor is now mostly formed of the circuit board portion of the stator assembly shown again, but in section at 240. A rigid shaft support element completes the base portion of the motor and is shown at 258. This can be formed of aluminum but also can be an engineering plastic. The shaft support element supports a fixed motor shaft shown at 260. The shaft extension above the shaft support element extends through the entire center of the basic rotor element portion of the total rotor assembly shown generally at 262. The rotor assembly spins on the fixed shaft when the motor is activated. The self-lubricating properties of the plastic material used in the molding and construction of the basic rotor element provides the necessary lubricated surface for the spinning rotor of the motor. Viewing the rotor assembly in detail demonstrates the rotor assembly outside magnet back-iron component ring first shown in FIG. 21 and here in section at 242 with the attached outside magnet component ring at 264. Additionally, the inside magnet back-iron component ring is shown at 266 with the attached inside magnet component ring at 268. As before, the air gap facing surfaces of the magnet component rings are juxtaposed the confronting stator pole element inward and outward facing surfaces looking across the motor operating air gaps, the magnet rings and the stator pole element radial surfaces each having similar vertical surface extents on the outside pair and also on the inside pair with the inside vertical pair generally being greater in vertical extent. Note, in this embodiment the entire stator pole assembly is over-molded as compared to the visual demonstration in preceding embodiments and is shown at 270. The rigid over-molding provides the required mechanical integrity to the circular stator pole module array. An over-molded stator pole module is depicted at 272. It contains the basic stator pole element at 248, first shown in FIG. 22, and the supporting bobbin at 254 plus the winding at 256. The motor inside air gap is evident at 274 and the outside air gap at 276. With a three-phase motor design the six stator poles are most likely accompanied with either four or eight alternating pole magnet component rings.

The motor power presented in the motor design of the six-pole stator motor of FIG. 21 can be reduced along with accompanying cost by implementing the changes presented in the next embodiment shown at 278 in FIG. 24. From the outside the components resemble those of FIG. 21 and are incorporated herein.

In this three-phase configuration the changes become evident as we move to stator assembly shown at 280 in FIG. 25. Most important is the addition of an inside stator pole module flux conducting ring shown at 282. This modifies the basic TwinGap architecture converting the architecture to a single gap design (unigap) by eliminating the former inside magnet back iron component ring and the accompanying inside magnet component ring from the former rotor assembly 262 shown in FIG. 23. The addition of the stator pole module flux conducting ring to the stator assembly effectively replaces the coil flux conducting function of the previous, rotor mounted, inside back iron component ring. The stator pole module flux conducting ring is sized to carry both the flux from the energized stator winding as well as from the outside magnet component ring and is placed in intimate contact with the inner radial surface of the individual stator pole elements. This unigap design modification can also be fashioned around an outside stator pole module flux conducting ring in place of the shown inside ring so the only operating motor air gap would be on the inside and the motor rotor would not then need to extend radially beyond the motor inside operating air gap. A motor with the power of the previous TwinGap architecture motor shown in FIG. 23 can be designed with this approach but generally there will be an accompanying increase in size. The other visual design change shown in FIG. 25 as compared to the previous stator pole assembly design presented in FIG. 22 is the elimination of three of the windings on three of the stator pole modules, one evident at 284. Because this is a three-phase motor design, this modification eliminates one of the previous two stator pole module windings in each of the three phases. This modification is independent of the conversion to a unigap gap motor design and to the introduction of the stator pole module flux conducting ring shown at 282 and would generally be used only because of lower power requirement from the motor and the cost saving achieved by elimination of three of the windings. Going to a lower stator pole module count with this form of stator assembly design is not practical which is why this option is shown here. The definitions and identities of the other component parts of the stator pole modules and circuit board are the same as presented in FIG. 22. Additional modifications other than those described example modifications are readily apparent to a person having ordinary skill in the art. The conversion of the TwinGap motor architecture to a single inside or outside gap motor design (unigap) would not normally be accompanied with the elimination of some of the stator pole module windings plus this unigap conversion can be applied to larger motors with higher stator pole module pole counts. For example, if minimal rotor inertia were critical to the design, a unigap approach with only the inside operating air gap would better achieve that goal while still achieving the same stator assembly process as presented herein using individual stator pole modules.

Looking now at FIG. 26 the motor of FIG. 24 is depicted in cross section generally at 278. In this embodiment there is only a single operating air gap (unigap), shown at 286 and the previous inside operating air gap is replaced with the stator pole module flux conducting ring, previously shown in FIG. 25 at 282, and shown here in FIG. 26 in section view. The circuit board, shaft support element and motor shaft are the same as in the previous embodiment and are not re-labeled here. In fact, the basic rotor element is also the same. What is missing from the rotor assembly identified here in FIG. 26 at 288 in comparison to the rotor assembly 262 of FIG. 23 is the inside motor back-iron component ring and accompanying inside magnet component ring. The outside rotor back-iron component ring identified here at 290 and attached outside magnet component ring shown here at 292 interfaces, as before, in juxtaposed relationship with the stator pole element 294 confronting radial surface, but, in this embodiment, only on the outside radial surface of the stator pole element. Stator pole element 294 is a wound stator pole element that is part of a wound stator pole module defined here at 296 also containing the bobbin for that module shown at 298 and the winding shown at 300. Conversely, in this embodiment, the stator pole module on the radial opposite side of the motor shown here at 284 as in FIG. 25 is void of the electrical winding but contains the stator pole element shown at 302 and the bobbin shown at 304. The bobbin is to keep the stator pole module properly located and mounted in position in the circular array of stator pole modules located on the printed circuit board as was shown in FIG. 25 and previously in FIG. 22. The maintenance of the six stator pole elements is necessary (wound or not) in order to maintain the basic de-energized motor characteristics that would be present if all six windings were present in the design. Again, the operating air gap 286 could exist in a reverse air gap design on the inside facing surface of the stator pole elements with the stator flux conducting ring then located on the outside of the assembled stator pole modules for reasons such as stated above. In all these embodiments the stator pole elements are shown with the TaperPole form of construction but they could also be formed similar to the shape shown in FIG. 8 or 9 or possibly other suitable shapes such as the embodiment of FIG. 8 without the top and bottom SMC portions, as discussed earlier. The principal controlling factor being the presenting of an inside radial stator pole element surface and an outside radial stator pole element surface in an assembly of individual stator pole modules. Although desirable for overall best performance the matched surface areas of the inside and outside radial stator pole elements is not required nor is the matched extent of the pole element circumferential angle on the inside vs. the outside which depends on the motor design objectives. It is not necessary in the unigap versions of the described invention. The TaperPole shape of the basic stator pole elements provides the maximum possible radial winding length for a given radial pole length plus the tapered cross section shape provides the least obstructed path for flux conduction when designing for uniformly matched inside and outside radial surface areas with equal radial angles to both the inside and outside pole surface circumferential extents. Since certain changes may be made in the above described embodiments without departing from the scope of the invention herein involved, it is intended that all matter contained in the description thereof or shown in the accompanying drawings shall be interpreted as illustrative and not in a limiting sense.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A permanent-magnet-on-rotor electric motor apparatus, comprising:
    a rotor assembly configured to rotate about a motor axis and comprising
    a rotor component,
        an inner magnet component ring, comprising a first radius extending from the motor axis, a plurality of rotor magnet poles that are magnetized radially, and an inner back-iron component ring, connected to an inside of the inner magnet component ring proximal to the motor axis,
        an outer magnet component ring, configured and disposed to be similar, concentric and parallel to the inner magnet component ring, and comprising a second radius extending from the motor axis, a plurality of rotor magnet poles that are magnetized radially, and an outer back-iron component ring, connected to an outside of the outer magnet component ring distal to the motor axis;
    a stator assembly, configured to be co-located with the rotor assembly about the motor axis, comprising a plurality of stator pole modules mounted on an insulating surface in a circular arrangement concentric with both the outer magnet component ring and the inner magnet component ring, wherein each stator pole module of the plurality of stator pole modules comprises one or more coil windings and a stator pole element with an iron-based core, an inner radial surface opposite an outer radial surface offset from the inner radial surface by a normal distance dimensioned and disposed to fit between, and be approximately axially co-extensive with, the inner magnet component ring and the outer magnet component ring;
    wherein a cross section shape of each stator pole element changes from a first perimeter of each inner radial surface to a second perimeter of each outer radial surface by increasing circumferential length while reducing axial length in a direction parallel to the motor axis to maintain the outer radial surface area as approximately equal to the inner radial surface area; and
    wherein the one or more coil windings are configured and disposed to be interconnected electrically in a wound-pole arrangement corresponding to a basic electrical design requirement of the permanent-magnet-on-rotor electric motor apparatus, wherein the basic electrical design requirement comprises a number of motor phases, a number of stator poles, a number of rotor poles, and an electrical drive methodology.

2. The permanent-magnet-on-rotor electric motor apparatus of claim 1, wherein the stator assembly is over-molded with a mechanical support comprising an electrically insulating, non-magnetic material forming connections between each of the plurality of stator pole modules and connecting to the insulating surface, wherein the mechanical support is configured and disposed to be placed between a first circular limit having a third radius corresponding to each inner radial surface and a second circular limit having a fourth radius corresponding to each outer radial surface.

3. The permanent-magnet-on-rotor electric motor apparatus of claim 1, wherein the insulating surface of the stator assembly comprises a printed circuit board comprising electrical interconnections between the one or more coil windings and mechanical support for the plurality of stator pole modules in placement locations around a circumference of the circular arrangement.

4. The permanent-magnet-on-rotor electric motor apparatus of claim 1, wherein each stator pole element of the plurality of stator pole modules comprises a pressure-shaped iron-based soft magnetic composite material.

5. The permanent-magnet-on-rotor electric motor apparatus of claim 1, wherein each stator pole element of the plurality of stator pole modules comprises a motor lamination material.

6. The permanent-magnet-on-rotor electric motor apparatus of claim 1, wherein the first perimeter of each inner radial surface is connected to the second perimeter of each outer radial surface of each stator pole element by a first planar surface, a second planar surface, a third planar surface, and a fourth planar surface in a non-parallel configuration, thereby circumscribing approximately equal radial cross-sectional areas for each stator pole element.

7. The permanent-magnet-on-rotor electric motor apparatus of claim 1, wherein each of the plurality of stator pole modules comprises an insulative bobbin arrangement surrounding, supporting, and locating each stator pole element of the plurality of stator pole modules on the insulating surface, and supporting the one or more coil windings.

8. The permanent-magnet-on-rotor electric motor apparatus of claim 1, wherein the inner magnet component ring of the rotor assembly comprises a plastic injection moldable magnetic material integral with the inner back-iron component ring, and wherein the outer magnet component ring of the rotor assembly comprises a plastic injection moldable magnetic material integral with the outer back-iron component ring.

9. The permanent-magnet-on-rotor electric motor apparatus of claim 1, wherein the inner magnet component ring and the outer magnet component ring are magnetized with eight alternating poles, and the stator assembly comprises nine stator pole modules and a plurality of coil windings are interconnected for three-phase motor operation, energized in a three-phase motor electrical sequence to produce motor rotation.

10. The permanent-magnet-on-rotor electric motor apparatus of claim 1, wherein the plurality of stator pole modules are each automatically assembled in a circular array on a printed circuit board comprising electrical interconnections between each stator pole element comprising a wound coil configuration, mechanical support and mechanical placement locations for the plurality of stator pole modules.

11. A stator assembly for a permanent-magnet-on-rotor electric motor, configured to be co-located with a rotor assembly about a motor axis, comprising:
    a plurality of stator pole modules mounted on a supporting surface in a circular arrangement concentric with at least one magnet component ring, wherein each stator pole module of the plurality of stator pole modules comprises a stator pole element with an iron-based core, with an inner radial surface opposite an outer radial surface offset from the inner radial surface by a normal distance and configured to be axially co-extensive with, at least one magnet component ring;
    wherein a cross section shape of each of the stator pole elements changes from a first perimeter of each inner radial surface to a second perimeter of each outer radial surface by increasing circumferential length while reducing axial length in a direction parallel to the motor axis to maintain the outer radial surface area as approximately equal to the inner radial surface area; and
    wherein each of the plurality of stator pole modules comprises an insulative bobbin arrangement circumscribing, supporting, and mounting each stator pole element of the plurality of stator pole modules on the supporting surface, and wherein stator pole elements of the plurality of stator pole modules further comprising wound stator pole elements are interconnected electrically in a wound-pole arrangement and electrically activated sequentially to produce motor rotation.

12. The stator assembly of claim 11, wherein each of the stator pole elements of the plurality of stator pole modules comprises a motor lamination material.

13. The stator assembly of claim 11, wherein the supporting surface of the stator assembly comprises an electrical circuit board comprising electrical interconnections between the wound stator pole elements and mechanical support for the plurality of stator pole modules in the circular arrangement.

14. The stator assembly of claim 11, wherein each of the stator pole elements of the plurality of stator pole modules comprises a pressure-shaped iron-based soft magnetic composite material.

15. The stator assembly of claim 11, wherein the first perimeter of each inner radial surface is connected to the second perimeter of each outer radial surface of each stator pole element by a first planar angled surface, a second planar angled surface, a third planar angled surface, and a fourth planar angled surface in a non-parallel configuration, thereby circumscribing approximately equal radial cross-sectional areas for each stator pole element.

16. The stator assembly of claim 11, wherein the stator assembly is over-molded with a mechanical support comprising an electrically insulating, non-magnetic material forming connections between each of the plurality of stator pole modules and connecting to the supporting surface, wherein the mechanical support is configured and disposed to be placed between a first circular limit having a third radius corresponding to each inner radial surface and a second circular limit having a fourth radius corresponding to each outer radial surface.

17. The stator assembly of claim 11, wherein the plurality of stator pole modules are each automatically assembled in a circular array on an electrical circuit board comprising electrical interconnections between the wound stator pole elements and mechanical support and mechanical placement locations for the plurality of stator pole modules.

18. The stator assembly of claim 11, further comprising an iron-based stator pole module flux conducting ring, concentrically contacting the inner radial surface of each stator pole element of the plurality of stator pole modules, comprising a cross section configured to conduct magnetic flux of the permanent-magnet-on-rotor electric motor present in the iron-based stator pole module flux conducting ring at a rated threshold operating voltage and current.

19. The stator assembly of claim 18, wherein each of the stator pole elements of the plurality of stator pole modules is radially confronted on the outer radial surface by a rotor assembly comprising a permanent magnet ring concentrically offset from the outer radial surface by an air gap, wherein the permanent magnet ring is disposed approximately co-extensive axially with the outer radial surface of each of the stator pole elements, and wherein the rotor assembly is mounted for rotation concentrically around the motor axis shared by the rotor assembly and the stator assembly.

20. The stator assembly of claim 11, further comprising an iron-based stator pole module flux conducting ring, concentrically contacting the outer radial surface of each stator pole element of the plurality of stator pole modules, comprising a cross section configured to conduct magnetic flux of the permanent-magnet-on-rotor electric motor present in the iron-based stator pole module flux conducting ring at a rated threshold operating voltage and current.

21. The stator assembly of claim 20, wherein each of the stator pole elements of the plurality of stator pole modules is radially confronted on the inner radial surface by a rotor assembly comprising a magnet component ring concentrically offset from the inner radial surface by an air gap and disposed approximately co-extensive axially with each stator pole element inner radial surface, wherein the rotor assembly is mounted for rotation concentrically around the motor axis shared by the rotor assembly and the stator assembly.

22. The stator assembly of claim 11, wherein the stator assembly is surrounded by a rotor comprising a first magnet component ring and a second magnet component ring concentric with, and offset from, the first magnet component ring, disposed around the plurality of stator pole modules such that the first magnet component ring confronts, and is offset by a first air gap from, the inner radial surface of each stator pole element, and the second magnet component ring confronts, and is offset by a second air gap from, the outer radial surface of each stator pole element, wherein the first magnet component ring is backed by and connected, opposite the first air gap, to a first back-iron component ring, disposed in flux conducting relationship with the first magnet component ring and the second magnet component ring is backed by and connected, opposite the second air gap, to a second back-iron component ring, disposed in flux conducting relationship with the second magnet component ring, wherein each stator pole element of the plurality of stator pole modules is approximately co-extensive axially with the first magnet component ring and the second magnet component ring, with the rotor configured and mounted for rotation around the motor axis.

23. A rotor assembly for a permanent-magnet-on-rotor electric motor, comprising:
    a rotor component configured to rotate about a motor axis, which locates and supports an assembly of;
        an inner magnet component ring, comprising a first radius extending from the motor axis, and an inner back-iron component ring, connected to an inside of the inner magnet component ring proximal to the motor axis; and an outer magnet component ring, configured and disposed to be similar, concentric and parallel to the inner magnet component ring, and comprising a second radius extending from the motor axis, a plurality of rotor magnet poles that are magnetized radially, and an outer back-iron component ring, connected to an outside of the outer magnet component ring distal to the motor axis;

wherein the inner magnet component ring and the outer magnet component ring are both facing and magnetized in an aiding relationship comprising a north outward facing pole on the inside magnet ring facing a motor inside air gap and a south inward facing pole on the outside magnet ring facing a outside motor air gap alternating reverse magnetized poles on circumferential adjacent rotor magnet poles proceeding around the rotor assembly;

wherein the plurality of rotor magnet poles of the inner magnet component ring have an axial length in a direction parallel to the motor axis that is greater than an axial length of the plurality of rotor magnet poles of the outer magnet component ring such that the plurality of rotor magnet poles of the inner magnet component ring has approximately the same axial length as an inner radial surface of a stator pole element of a stator pole module disposed between the inner magnet component ring and the outer magnet component ring and the plurality of rotor magnet poles of the outer magnet component ring are approximately the same axial height as the outer radial surface height of the stator pole element, wherein the stator pole element of the stator pole module has a cross section shape that changes from a first perimeter of the inner radial surface to a second perimeter of the outer radial surface by increasing circumferential length while reducing axial length to maintain the outer radial surface area as approximately equal to the inner radial surface area.

24. The rotor assembly of claim 23, wherein the outer back-iron component ring is configured and disposed in a common flux conducting relationship with the inner back-iron component ring across top distal surfaces of the outer back-iron component ring and the inner back-iron component ring, so as to be mounted for rotation about the motor axis.

* * * * *